US010976500B2

(12) United States Patent
Ott et al.

(10) Patent No.: US 10,976,500 B2
(45) Date of Patent: Apr. 13, 2021

(54) FIELD INSTALLED FIBER OPTIC CONNECTOR

(71) Applicant: COMMSCOPE TECHNOLOGIES LLC, Hickory, NC (US)

(72) Inventors: Michael James Ott, Hudson, WI (US); Yu Lu, Eden Prairie, MN (US); Ponharith Nhep, Savage, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/807,810

(22) Filed: Mar. 3, 2020

(65) Prior Publication Data

US 2020/0271868 A1 Aug. 27, 2020

Related U.S. Application Data

(63) Continuation of application No. 16/063,192, filed as application No. PCT/US2016/066952 on Dec. 15, 2016, now Pat. No. 10,641,970.

(60) Provisional application No. 62/268,418, filed on Dec. 16, 2015.

(51) Int. Cl.
*G02B 6/38* (2006.01)
*G02B 6/44* (2006.01)

(52) U.S. Cl.
CPC ......... *G02B 6/3831* (2013.01); *G02B 6/3825* (2013.01); *G02B 6/3887* (2013.01); *G02B 6/3893* (2013.01); *G02B 6/3894* (2013.01); *G02B 6/44* (2013.01); *G02B 6/3834* (2013.01); *G02B 6/3871* (2013.01); *G02B 6/3891* (2013.01); *G02B 6/4471* (2013.01)

(58) Field of Classification Search
None
See application file for complete search history.

(56) References Cited

U.S. PATENT DOCUMENTS

| 4,201,444 A | 5/1980 | McCartney et al. |
| 4,217,030 A | 8/1980 | Howarth |
| 4,268,115 A | 5/1981 | Slemon et al. |
| 4,327,964 A | 5/1982 | Haesly et al. |

(Continued)

FOREIGN PATENT DOCUMENTS

| CN | 1175002 A | 3/1998 |
| CN | 1333471 A | 1/2002 |

(Continued)

OTHER PUBLICATIONS

International Search Report and Written Opinion of the International Searching Authority for International Patent Application No. PCT/US2016/066952 dated Mar. 16, 2017, 2 pages.

(Continued)

*Primary Examiner* — Jerry Rahll
(74) *Attorney, Agent, or Firm* — Merchant & Gould P.C.

(57) ABSTRACT

The present disclosure relates to a field installable connector system. The connector system includes a factory terminated subassembly including a ferrule terminating an optical fiber of an optical fiber cable. The factory terminated subassembly has a small transverse cross-section to facilitate routing through a duct. The connector system also includes a field installable subassembly including various connector components that can be installed after the factory terminated subassembly has been routed through a duct. The components can be sealed and hardened.

20 Claims, 25 Drawing Sheets

(56) References Cited

U.S. PATENT DOCUMENTS

| | | |
|---|---|---|
| 4,635,875 A | 1/1987 | Apple |
| 4,691,988 A | 9/1987 | Temblay et al. |
| 4,715,675 A | 12/1987 | Kevern et al. |
| 4,762,389 A | 8/1988 | Kaihara |
| 5,212,752 A | 5/1993 | Stephenson et al. |
| 5,216,733 A | 6/1993 | Nagase et al. |
| 5,231,685 A | 7/1993 | Hanzawa et al. |
| 5,245,683 A | 9/1993 | Belenkiy et al. |
| 5,261,019 A | 11/1993 | Beard et al. |
| 5,287,425 A | 2/1994 | Chang |
| 5,452,386 A | 9/1995 | Van Woesik |
| 5,465,313 A | 11/1995 | Belenkiy et al. |
| 5,471,713 A | 12/1995 | Alter et al. |
| 5,524,159 A | 6/1996 | Turgeon et al. |
| 5,619,610 A | 4/1997 | King et al. |
| 5,637,010 A | 6/1997 | Jost et al. |
| 5,640,476 A | 6/1997 | Womack et al. |
| 5,682,541 A | 10/1997 | Lee et al. |
| 5,809,192 A | 9/1998 | Manning et al. |
| 5,862,289 A | 1/1999 | Walter et al. |
| 5,863,083 A | 1/1999 | Giebel et al. |
| 5,897,393 A | 4/1999 | Haftmann |
| 5,898,808 A | 4/1999 | Morlion et al. |
| 5,915,058 A | 6/1999 | Clairardin et al. |
| 5,946,435 A | 8/1999 | Zheng et al. |
| 5,946,436 A | 8/1999 | Takashi |
| 5,953,475 A | 9/1999 | Beier et al. |
| 6,019,520 A | 2/2000 | Lin et al. |
| 6,079,881 A | 6/2000 | Roth |
| 6,081,647 A | 6/2000 | Roth et al. |
| 6,151,432 A | 11/2000 | Nakajima et al. |
| 6,154,597 A | 11/2000 | Roth |
| 6,245,999 B1 | 6/2001 | Costigan et al. |
| 6,287,018 B1 | 9/2001 | Andrews et al. |
| 6,296,399 B1 | 10/2001 | Halbach et al. |
| 6,325,547 B1 | 12/2001 | Cammons et al. |
| 6,396,993 B1 | 5/2002 | Giebel et al. |
| 6,398,422 B1 | 6/2002 | Szilagyi et al. |
| 6,419,399 B1 | 7/2002 | Loder et al. |
| 6,429,373 B1 | 8/2002 | Scrimpshire et al. |
| 6,482,215 B1 | 8/2002 | Nault |
| 6,540,410 B2 | 4/2003 | Childers et al. |
| 6,550,978 B2 | 4/2003 | De Marchi |
| 6,579,014 B2 | 6/2003 | Melton et al. |
| 6,648,520 B2 | 11/2003 | McDonald et al. |
| 6,672,774 B2 | 1/2004 | Theuerkom et al. |
| 6,695,489 B2 | 2/2004 | Nault |
| 6,811,321 B1 | 11/2004 | Schmalzigaug et al. |
| 6,899,467 B2 | 5/2005 | McDonald et al. |
| 6,902,140 B1 | 6/2005 | Huang |
| 6,913,392 B2 | 7/2005 | Grzegorzewska et al. |
| 6,935,789 B2 | 8/2005 | Gross, III et al. |
| 6,945,704 B2 | 9/2005 | Yamaguchi |
| 6,960,025 B2 | 11/2005 | Gurreri |
| 7,090,406 B2 | 8/2006 | Melton et al. |
| 7,147,384 B2 | 12/2006 | Hardcastle et al. |
| 7,198,409 B2 | 4/2007 | Smith et al. |
| 7,204,016 B2 | 4/2007 | Roth et al. |
| 7,204,644 B2 | 4/2007 | Barnes et al. |
| 7,226,215 B2 | 6/2007 | Bareel et al. |
| 7,281,859 B2 | 10/2007 | Mudd et al. |
| 7,344,317 B2 | 3/2008 | Krowiak et al. |
| 7,357,579 B2 | 4/2008 | Feldner |
| 7,369,738 B2 | 5/2008 | Larson et al. |
| 7,510,335 B1 | 3/2009 | Su et al. |
| 7,530,745 B2 | 5/2009 | Holmquist |
| 7,572,065 B2 | 8/2009 | Lu et al. |
| 7,574,095 B2 | 8/2009 | Lock et al. |
| 7,614,797 B2 | 11/2009 | Lu et al. |
| 7,614,799 B2 | 11/2009 | Bradley et al. |
| 7,676,132 B1 | 3/2010 | Mandry et al. |
| 7,712,974 B2 | 5/2010 | Yazaki et al. |
| 7,744,288 B2 | 6/2010 | Lu et al. |
| 7,775,726 B2 | 8/2010 | Pepin et al. |
| 7,785,015 B2 | 8/2010 | Melton et al. |
| 7,806,599 B2 | 10/2010 | Margolin et al. |
| 7,838,775 B2 | 11/2010 | Montena |
| 8,311,378 B2 | 11/2012 | Niiyama et al. |
| 8,391,664 B2 | 3/2013 | Kowalczyk et al. |
| 8,393,803 B2 | 3/2013 | Hogue |
| 8,439,577 B2 | 5/2013 | Jenkins |
| 8,443,488 B2 | 5/2013 | Zhang |
| 8,480,312 B2 | 7/2013 | Smith et al. |
| 8,548,293 B2 | 10/2013 | Kachmar |
| 8,577,199 B2 | 11/2013 | Pierce et al. |
| 8,647,140 B2 | 2/2014 | Annecke |
| 8,753,022 B2 | 6/2014 | Schroeder et al. |
| 8,821,180 B2 | 9/2014 | Blakborn et al. |
| 9,106,003 B2 | 8/2015 | Anderson et al. |
| 9,130,303 B2 | 9/2015 | Anderson et al. |
| 9,182,567 B2 | 11/2015 | Mullaney |
| 9,216,530 B2 | 12/2015 | Vaccaro |
| 9,229,173 B2 | 1/2016 | Yamauchi et al. |
| 9,239,441 B2 | 1/2016 | Melton et al. |
| 9,268,102 B2 | 2/2016 | Daems et al. |
| 9,285,559 B1 | 3/2016 | Stockton et al. |
| 9,297,976 B2 | 3/2016 | Hill et al. |
| 9,417,403 B2 | 8/2016 | Mullaney et al. |
| 9,470,847 B2 | 10/2016 | Grinderslev |
| 9,557,496 B2 | 1/2017 | Irwin et al. |
| 9,739,971 B2 | 8/2017 | Eberle, Jr. et al. |
| 9,804,342 B2 | 10/2017 | Little et al. |
| 9,829,649 B2 | 11/2017 | Liu et al. |
| 9,910,224 B2 | 3/2018 | Liu et al. |
| 9,939,591 B2 | 4/2018 | Mullaney et al. |
| 9,971,104 B2 | 5/2018 | Tong et al. |
| 10,018,797 B2 | 7/2018 | Cheng et al. |
| 10,067,301 B2 | 9/2018 | Murray et al. |
| 10,073,224 B2 | 9/2018 | Tong et al. |
| 10,215,930 B2 | 2/2019 | Mullaney et al. |
| 10,281,649 B2 | 5/2019 | Nhep et al. |
| 10,466,425 B2 | 11/2019 | Liu et al. |
| 10,473,867 B2 | 11/2019 | Tong et al. |
| 10,591,678 B2 | 3/2020 | Mullaney et al. |
| 10,620,385 B2 | 4/2020 | Nhep et al. |
| 10,641,970 B2 | 5/2020 | Ott et al. |
| 10,698,166 B2 | 6/2020 | Liu et al. |
| 2001/0012428 A1 | 8/2001 | Nakajima et al. |
| 2001/0014197 A1 | 8/2001 | De Marchi |
| 2002/0076165 A1 | 6/2002 | Childers et al. |
| 2002/0106163 A1 | 8/2002 | Cairns |
| 2002/0139966 A1 | 10/2002 | Grithoen et al. |
| 2002/0186934 A1 | 12/2002 | Hug et al. |
| 2003/0077045 A1 | 4/2003 | Fleenor et al. |
| 2003/0215191 A1 | 11/2003 | Taira et al. |
| 2003/0231839 A1 | 12/2003 | Chen et al. |
| 2004/0023598 A1 | 2/2004 | Zimmel et al. |
| 2004/0076389 A1 | 4/2004 | Ozaki |
| 2004/0101254 A1 | 5/2004 | Erdman et al. |
| 2004/0105625 A1 | 6/2004 | Ueda et al. |
| 2004/0117981 A1 | 6/2004 | Roth et al. |
| 2004/0165832 A1 | 8/2004 | Bates, III et al. |
| 2004/0223699 A1 | 11/2004 | Melton et al. |
| 2005/0084215 A1 | 4/2005 | Grzegorzewska et al. |
| 2005/0135755 A1 | 6/2005 | Kiani et al. |
| 2006/0093300 A1 | 5/2006 | Marrs et al. |
| 2006/0115219 A1 | 6/2006 | Mudd et al. |
| 2007/0025665 A1 | 2/2007 | Dean, Jr. et al. |
| 2007/0172173 A1 | 7/2007 | Adomeit et al. |
| 2007/0263960 A1 | 11/2007 | Lock et al. |
| 2007/0284146 A1 | 12/2007 | Dower et al. |
| 2008/0011990 A1 | 1/2008 | Kostet et al. |
| 2008/0013891 A1 | 1/2008 | Nishioka et al. |
| 2008/0089650 A1 | 4/2008 | Legler et al. |
| 2008/0175546 A1 | 7/2008 | Lu et al. |
| 2008/0226234 A1 | 9/2008 | Droege |
| 2008/0226236 A1 | 9/2008 | Pepin et al. |
| 2008/0273855 A1 | 11/2008 | Bradley et al. |
| 2009/0148101 A1 | 6/2009 | Lu et al. |
| 2009/0148109 A1 | 6/2009 | Takahashi et al. |
| 2009/0185779 A1 | 7/2009 | Gurreri et al. |
| 2010/0202748 A1 | 8/2010 | Pierce et al. |
| 2011/0002586 A1 | 1/2011 | Nhep |
| 2011/0097044 A1 | 4/2011 | Saito et al. |

(56) References Cited

U.S. PATENT DOCUMENTS

| | | |
|---|---|---|
| 2011/0176785 A1 | 7/2011 | Kowalczyk et al. |
| 2012/0170896 A1 | 7/2012 | Skluzacek et al. |
| 2012/0243831 A1 | 9/2012 | Chen |
| 2012/0257859 A1 | 10/2012 | Nhep |
| 2013/0058615 A1 | 3/2013 | Matthew et al. |
| 2013/0077928 A1 | 3/2013 | Hsing |
| 2013/0094828 A1 | 4/2013 | Loeffelholz et al. |
| 2013/0101258 A1 | 4/2013 | Hikosaka et al. |
| 2013/0177283 A1 | 7/2013 | Theuerkom et al. |
| 2013/0322826 A1 | 12/2013 | Henke et al. |
| 2014/0023326 A1 | 1/2014 | Anderson et al. |
| 2014/0050446 A1 | 2/2014 | Chang et al. |
| 2014/0086534 A1 | 3/2014 | Lu et al. |
| 2014/0133808 A1 | 5/2014 | Hill et al. |
| 2014/0153878 A1 | 6/2014 | Mullaney |
| 2014/0219621 A1 | 8/2014 | Barnette, Jr. et al. |
| 2014/0295700 A1 | 10/2014 | Natoli et al. |
| 2015/0017827 A1 | 1/2015 | Vaccaro |
| 2015/0136439 A1 | 5/2015 | Vaccaro |
| 2015/0268434 A1 | 9/2015 | Barnette, Jr. et al. |
| 2016/0187590 A1 | 6/2016 | Lu |
| 2016/0306122 A1 | 10/2016 | Tong et al. |
| 2016/0349458 A1 | 12/2016 | Murray et al. |
| 2016/0356963 A1 | 12/2016 | Liu et al. |
| 2016/0356964 A1 | 12/2016 | Liu et al. |
| 2017/0131509 A1 | 5/2017 | Xiao et al. |
| 2018/0106972 A1 | 4/2018 | Liu et al. |
| 2018/0224608 A1 | 8/2018 | Liu et al. |
| 2018/0348447 A1 | 12/2018 | Nhep et al. |
| 2020/0088951 A1 | 3/2020 | Liu et al. |

FOREIGN PATENT DOCUMENTS

| | | |
|---|---|---|
| CN | 1910488 A | 2/2007 |
| CN | 101084460 A | 12/2007 |
| CN | 101084461 A | 12/2007 |
| CN | 101346653 A | 1/2009 |
| CN | 101641627 A | 2/2010 |
| CN | 201527493 U | 7/2010 |
| CN | 201926781 U | 8/2011 |
| CN | 102313934 A | 1/2012 |
| CN | 102360104 A | 2/2012 |
| CN | 102460259 A | 5/2012 |
| CN | 202583527 U | 12/2012 |
| CN | 202815276 U | 3/2013 |
| CN | 202956505 U | 5/2013 |
| CN | 203054267 U | 7/2013 |
| CN | 103353635 A | 10/2013 |
| CN | 203688854 U | 7/2014 |
| CN | 203786340 U | 8/2014 |
| CN | 203825243 U | 9/2014 |
| CN | 105093420 A | 11/2015 |
| CN | 105093421 A | 11/2015 |
| EP | 0 330 399 A1 | 8/1989 |
| EP | 0 429 398 A2 | 5/1991 |
| EP | 2 128 675 A1 | 12/2009 |
| EP | 2 355 286 A1 | 8/2011 |
| EP | 2 482 109 A2 | 8/2012 |
| EP | 2 031 719 B1 | 1/2013 |
| GB | 2 509 532 A | 7/2014 |
| JP | 2001-147344 A | 5/2001 |
| JP | 2004-126371 A | 4/2004 |
| JP | 2007-165235 A | 6/2007 |
| JP | 2008-152266 A | 7/2008 |
| WO | 01/40839 A1 | 6/2001 |
| WO | 02/052310 A2 | 7/2002 |
| WO | 2006/069092 A2 | 6/2006 |
| WO | 2006/069093 A1 | 6/2006 |
| WO | 2008/091720 A1 | 7/2008 |
| WO | 2010/118031 A1 | 10/2010 |
| WO | 2012/037727 A1 | 3/2012 |
| WO | 2012/125836 A2 | 6/2012 |
| WO | 2013/077969 A1 | 5/2013 |
| WO | 2013/126429 A2 | 8/2013 |
| WO | 2017/106507 A1 | 6/2017 |

OTHER PUBLICATIONS

Extended European Search Report for corresponding European Patent Application No. 16876693.9 dated Jun. 19, 2019, 12 pages.
Fabricating with XIAMETER® High Consistency Silicon Rubber, Product Guide, Silicones Simplified XIAMETER® from Dow Corning, 50 pages. (2009).
XIAMETER® brand High Consistency Rubber (HCR) Bases—Asia (Excluding Japan) Selection Guide, Silicones Simplified XIAMETER® from Dow Corning, 6 pages. (2011).

FIELD INSTALLED FIBER OPTIC CONNECTOR

CROSS-REFERENCE TO RELATED APPLICATION

This application is a Continuation of U.S. patent application Ser. No. 16/063,192, filed on Jun. 15, 2018, now U.S. Pat. No. 10,641,970, which is a National Stage Application of PCT/US2016/066952, filed on Dec. 15, 2016, which claims the benefit of U.S. Patent Application Ser. No. 62/268,418, filed on Dec. 16, 2015, the disclosures of which are incorporated herein by reference in their entireties. To the extent appropriate, a claim of priority is made to each of the above disclosed applications.

TECHNICAL FIELD

The present disclosure relates to fiber optic data transmission, and more particularly to fiber optic cable connection systems.

BACKGROUND

Fiber optic cables are widely used to transmit light signals for high speed data transmission. A fiber optic cable typically includes: (1) an optical fiber or optical fibers; (2) a buffer or buffers that surrounds the fiber or fibers; (3) a strength layer that surrounds the buffer or buffers; and (4) an outer jacket. Optical fibers function to carry optical signals. A typical optical fiber includes an inner core surrounded by a cladding that is covered by a coating. Buffers (e.g., loose or tight buffer tubes) typically function to surround and protect coated optical fibers. Strength layers add mechanical strength to fiber optic cables to protect the internal optical fibers against stresses applied to the cables during installation and thereafter. Example strength layers include aramid yarn, steel and epoxy reinforced glass roving. Outer jackets provide protection against damage caused by crushing, abrasions, and other physical damage. Outer jackets also provide protection against chemical damage (e.g., ozone, alkali, acids).

Fiber optic cable connection systems are used to facilitate connecting and disconnecting fiber optic cables in the field without requiring a splice. A typical fiber optic cable connection system for interconnecting two fiber optic cables includes fiber optic connectors mounted at the ends of the fiber optic cables, and a fiber optic adapter for mechanically and optically coupling the fiber optic connectors together. Fiber optic connectors generally include ferrules that support the ends of the optical fibers of the fiber optic cables. The end faces of the ferrules are typically polished and are often angled. The fiber optic adapter includes co-axially aligned ports (i.e., receptacles) for receiving the fiber optic connectors desired to be interconnected. The fiber optic adapter includes an internal sleeve that receives and aligns the ferrules of the fiber optic connectors when the connectors are inserted within the ports of the fiber optic adapter. With the ferrules and their associated fibers aligned within the sleeve of the fiber optic adapter, a fiber optic signal can pass from one fiber to the next. The adapter also typically has a mechanical fastening arrangement (e.g., a snap-fit arrangement) for mechanically retaining the fiber optic connectors within the adapter. One example of an existing fiber optic connection system is described at U.S. Pat. Nos. 6,579,014, 6,648,520, and 6,899,467.

Hardened (e.g., ruggedized) fiber optic connection systems are often used for outside environments. Hardened fiber optic connection systems are typically environmentally sealed and include robust connection interfaces capable of accommodating relatively large pulling loads. A typical hardened connector includes a twist-to-lock fastener (e.g., a threaded fastener, a bayonet type fastener or like fastener) that engages a mating twist-to-lock interface defined by a corresponding hardened fiber optic adapter to securely retain the hardened connector within the hardened adapter. Example hardened connection systems are disclosed by U.S. Pat. Nos. 7,572,065; 7,744,288; and 7,090,406. Typical hardened fiber optic connectors are typically more bulky and robust than their non-hardened counterparts.

When installing a fiber optic network, it is often desired to route fiber optic cable through ducts (e.g., underground ducts, ducts in buildings, etc.). It is also desirable to use pre-terminated connectors on fiber optic cables so that termination operations can be efficiently and precisely performed in a factory environment rather than being performed in the field. However, since fiber optic connectors are relatively large, typical cables with pre-terminated connectors cannot readily be routed through ducts. This issue is particularly problematic for hardened connectors due to their relatively large size. Improvements are needed in this area.

SUMMARY OF THE DISCLOSURE

The present disclosure relates to a field installable connector system. The connector system includes a factory terminated subassembly including a ferrule terminating an optical fiber of an optical fiber cable. The factory terminated subassembly has a small transverse cross-section to facilitate routing through a duct. The connector system also includes a field installable subassembly including various connector components that can be installed after the factory terminated subassembly has been routed through a duct. The components can be sealed and hardened.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

DETAILED DESCRIPTION

Aspects of the present disclosure relate to systems that are factory terminated that can also be readily deployed through ducts. In certain examples, the system can include a factory terminated subassembly including a ferrule mounted at the terminal end of an optical fiber of a fiber optic cable. The factory terminated subassembly can also include a hub supporting the ferrule. The fiber optic cable can include one or more tensile strength members that are anchored within the ferrule hub. The factory terminated subassembly can further include a spring mounted behind the ferrule hub and over the fiber optic cable. As used herein, "factory terminated" means that a ferrule is installed on a fiber of a cable at the factory. This can include direct terminations when the optical fiber of a cable is extended continuously to the ferrule, or splice-on terminations where the ferrule supports a stub optical fiber that is spliced to the optical fiber of the fiber optic cable.

Aspects of the present disclosure also relate to field installable subassemblies having fiber optic connector components (e.g., housings, shells, seals, keys, plugs, etc.) that can be quickly and easily mounted over the factory terminated subassemblies in the field. It will be appreciated that the factory terminated subassemblies can have maximum cross-sectional dimensions that are substantially smaller than the transverse cross-sectional dimensions defined by the assembled field installable subassembly. The small size of the factory terminated subassembly allows the factory terminated subassembly to be readily routed through a duct in the field. Examples of various pushing techniques for use with the protective arrangement 500 are shown in U.S. Application No. 62/268,379, filed herewith, and titled "Arrangements for Pushing and Pulling Cables; and Methods," the disclosure of which is incorporated herein by reference. Once the factory terminated subassembly with its corresponding fiber optic cable has been routed through a duct, the field installable subassembly can be easily mounted over the factory terminated subassembly without requiring a skilled artisan. Additionally, it will be appreciated that the factory terminated subassembly can be compatible with a number of different categories/types of field installable subassemblies each corresponding to a different style or type of connector. The different types of connectors can include hardened and non-hardened. Thus, once the factory terminated subassembly has been routed through a given duct, the installer can select from a number of different connector styles so that the factory terminated subassembly can be converted into a fiber optic connector that is compatible with the type of fiber adapter encountered in the field.

Figure 1:
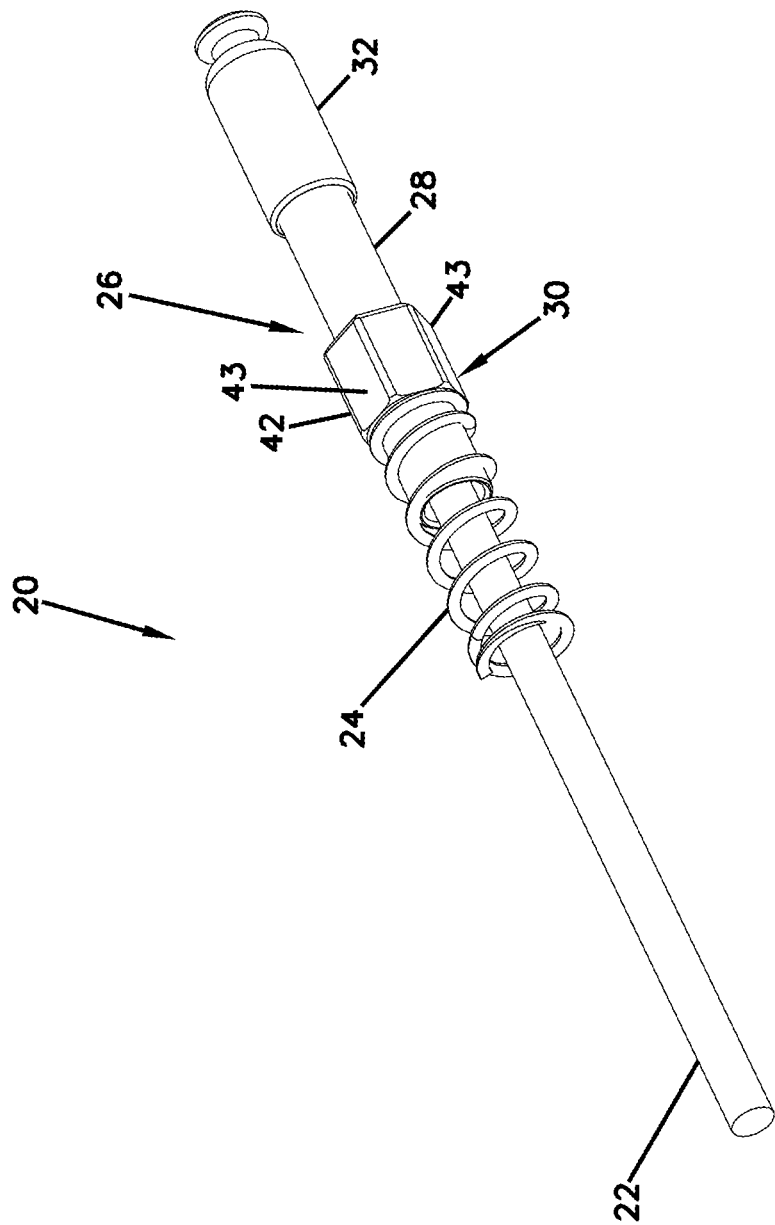
FIG. 1 illustrates a factory terminated subassembly in accordance with principles of the present disclosure.

FIG. 1 illustrates an example factory terminated subassembly 20 in accordance with the principles of the present disclosure. The factory terminated subassembly 20 includes a fiber optic cable 22, a spring 24, and a ferrule assembly 26. The ferrule assembly 26 includes a ferrule 28, a ferrule hub 30 mounted at a base end of the ferrule 28 and dust cap 32 mounted over a free end of the ferrule 28. The fiber optic cable 22 is preferably anchored to the ferrule hub 30.

Figure 2:
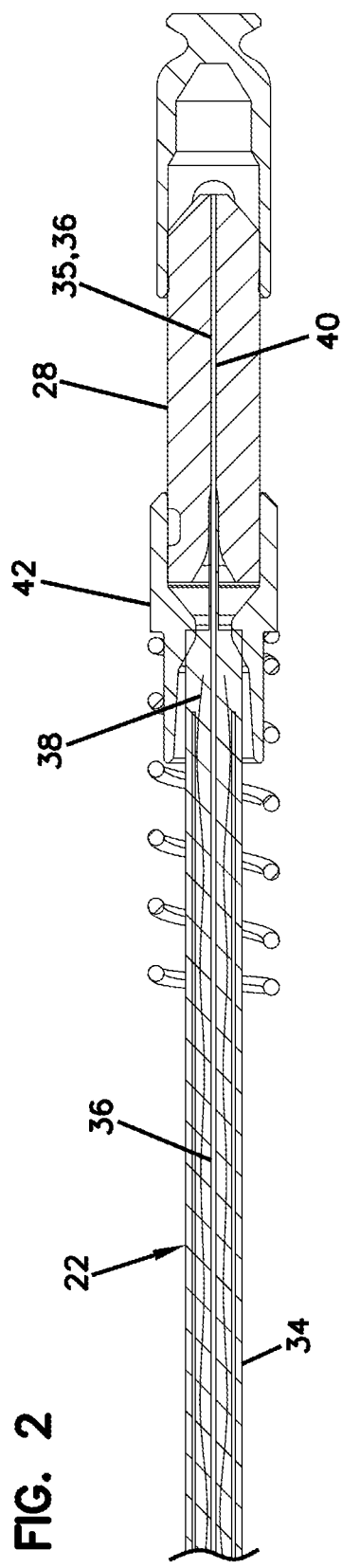
FIG. 2 is a longitudinal cross-sectional view of the factory terminated subassembly of FIG. 1.
Figure 3:
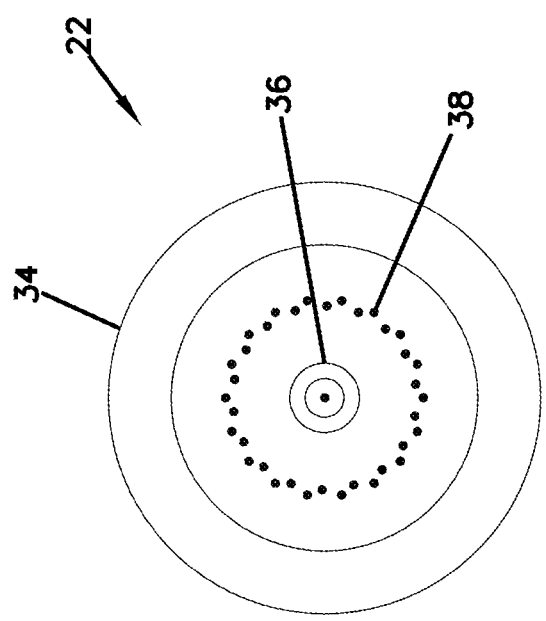
FIG. 3 is a cross-sectional view taken along section line 3-3 of FIG. 2.

In certain examples, the fiber optic cable 22 is relatively flexible while still exhibiting substantial tensile strength. As shown at FIGS. 2 and 3, the fiber optic cable 22 includes an outer jacket 34 containing an optical fiber 36. The fiber optic cable 22 can also include at least one strength member 38 enclosed within the outer jacket 34. In certain examples, the strength member 38 can include a strength layer that surrounds the optical fiber 36 and forms a barrier between the optical fiber and the outer jacket 34. In certain examples, strength member 38 can include a tensile reinforcing element such as a yarn that provides tensile reinforcement while concurrently providing minimal compressive reinforcement. In certain examples, the strength member 38 can include one or more aramid yarns. An example configuration for the fiber optic cable 22 is disclosed by U.S. Pat. No. 8,548,293, which is hereby incorporated by reference. In certain examples, fiber optic cable 22 has an outer diameter less than 2 mm, or less than 1.8 mm, or less than or equal to 1.5 mm.

In certain examples, the ferrule 28 can define a central fiber passage 40. An optical fiber section 35 can be secured (e.g., adhesively bonded) within the fiber passage 40 at the factory. The optical fiber section 35 can be optically coupled to the optical fiber 36 either by a splice or by a continuous integral coupling. Thus, the optical fiber section 35 can be considered part of the optical fiber regardless of whether a splice is used or not. Additionally, distal end faces of the optical fiber section 35 and the ferrule 28 can be processed (e.g., polished, angled, etc.) at the factory. As indicated above, the fiber optic cable 22 is preferably anchored to the ferrule hub 30. In certain examples, the strength members 38 of the fiber optic cable 22 can be coupled to the interior of the ferrule hub 30 via an adhesive material such as epoxy. In certain examples, the ferrule 28 can be an SC ferrule. In other examples, other types of ferrules such as LC ferrules may be used.

The ferrule hub 30 includes a flange 42 defining a plurality of discrete circumferential position indicators that are positioned circumferentially about a central longitudinal axis of the ferrule 28. As depicted, the circumferential position indicators include a plurality of flats 43 positioned circumferentially about the central longitudinal axis of the ferrule 28. In certain examples, the flats 43 are configured to provide the hub flange with a hexagonal transverse cross-sectional shape.

A typical single fiber optical connector includes a ferrule having an outer cylindrical surface that functions as a reference surface when the ferrule is received within an alignment sleeve of a fiber optic adapter. The ferrule also defines a central axial passageway in which the optical fiber is secured. Ideally, the optical fiber is secured in the central axial passageway with the fiber core perfectly concentric with the outer cylindrical surface of the ferrule. However, due to manufacturing tolerances, the fiber core is not typically perfectly concentric with the outer cylindrical surface. This is because, among other things, the ferrule passageway may not be concentric with the ferrule outer cylindrical surface, the optical fiber may not be centered in the ferrule passageway, and the fiber core may not be centered within the fiber cladding that defines an outer surface of the optical fiber. This lack of concentricity between the fiber core and the ferrule outer cylindrical surface causes fiber core eccentricity. Fiber core eccentricity can be defined as the distance between the central longitudinal axis of the fiber core (i.e., the fiber core axis) and the central longitudinal axis defined by the ferrule outer cylindrical surface (i.e., the ferrule axis). The direction that the fiber core axis is offset from the ferrule axis can be referred to as the direction of core eccentricity.

Due to fiber core eccentricity, signal losses within a system can occur at the connection between two optical fibers. This is because fiber core eccentricity prevents the fiber cores of the optical fibers being optically coupled together from being perfectly co-axially aligned. The worst-case scenario occurs when the ferrules of two fiber optic connectors being coupled together have directions of core eccentricity that are 180 degrees out of phase with respect to each other. To minimize the negative effect of fiber core eccentricity with respect to signal loss, it is desirable to position the directions of core eccentricity of the ferrules of fiber optic connectors being coupled together in the same rotational orientation. This can be accomplished by "tuning" fiber optic connectors during manufacturing such that the direction of core eccentricity is the same for all of the fiber optic connectors. Tuning typically involves rotating the ferrule to intentionally position the direction of core eccentricity of the ferrule at a particular rotational orientation relative to one or more keyed components of the fiber optic connector. Example tuning techniques are disclosed at PCT Publication No. WO 02/052310 and at U.S. Pat. No. 5,212,752, which are hereby incorporated by reference.

The discrete circumferential position indicators (e.g., the flats 43) provided on the hub 30 provide a means for allowing the factory terminated subassembly 20 to be tuned in the field. Specifically, in the factory, a core offset of the fiber core relative to the ferrule 28 can be determined. Once the core offset has been determined, a circumferential position indicator corresponding to the core offset can be marked so that the core offset can be readily identified in the field. In one example, the circumferential position indicator in alignment with the core offset direction can be marked. In another example, the circumferential position indicator offset 180° from the core offset direction can be marked. As long as a predetermined relationship between the arcing and the core offset is maintained, the direction of core offset can readily be determined in the field. Thus, when the ferrule assembly is loaded into a connector plug in the field, the installer can identify the core offset direction and make sure the ferrule assembly is loaded into the plug at the proper rotational orientation for the connector to be properly tuned.

Figure 4:
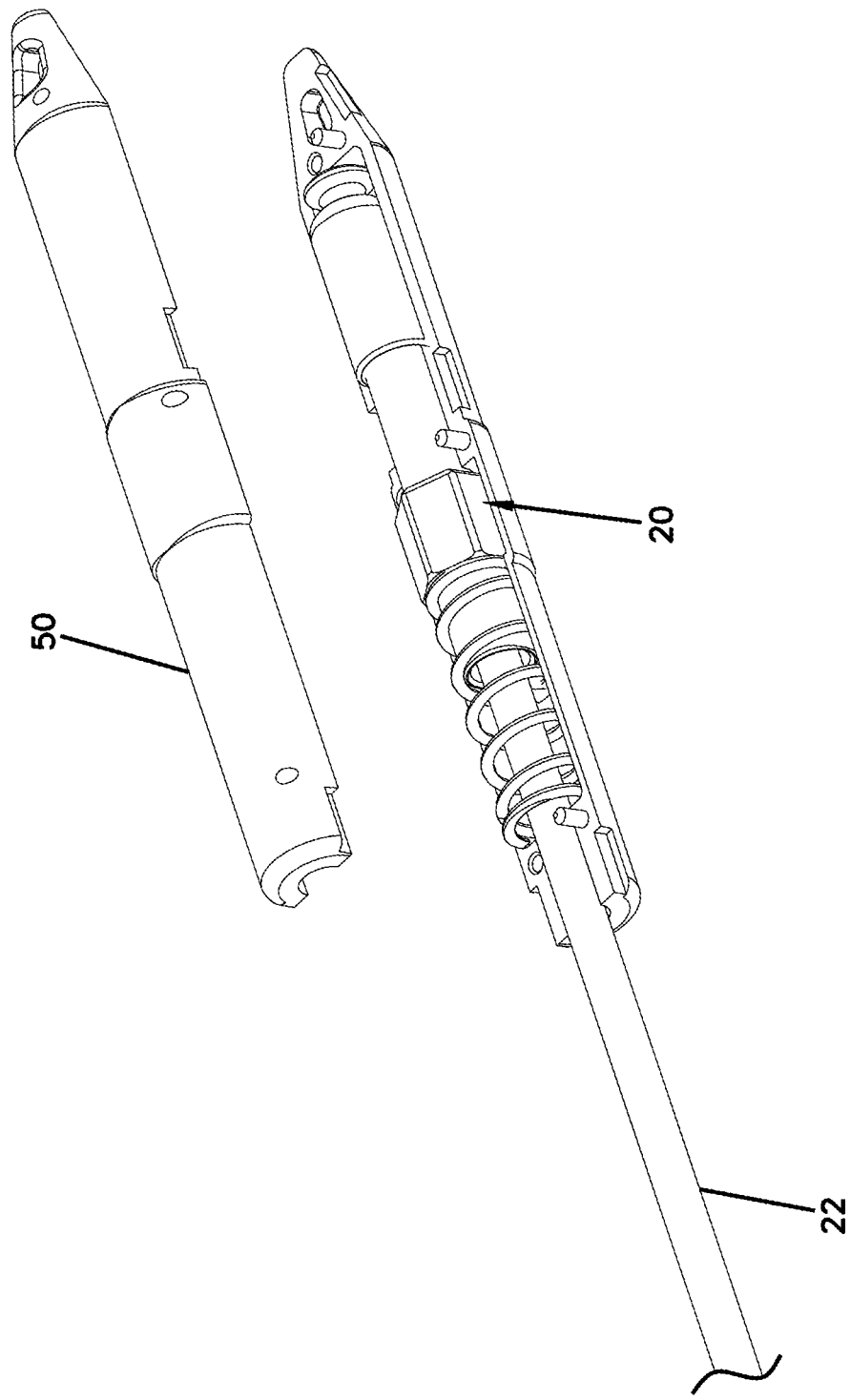
FIG. 4 shows the factory terminated subassembly of FIG. 1 in the process of being mounted within a protective carrier.
Figure 5:
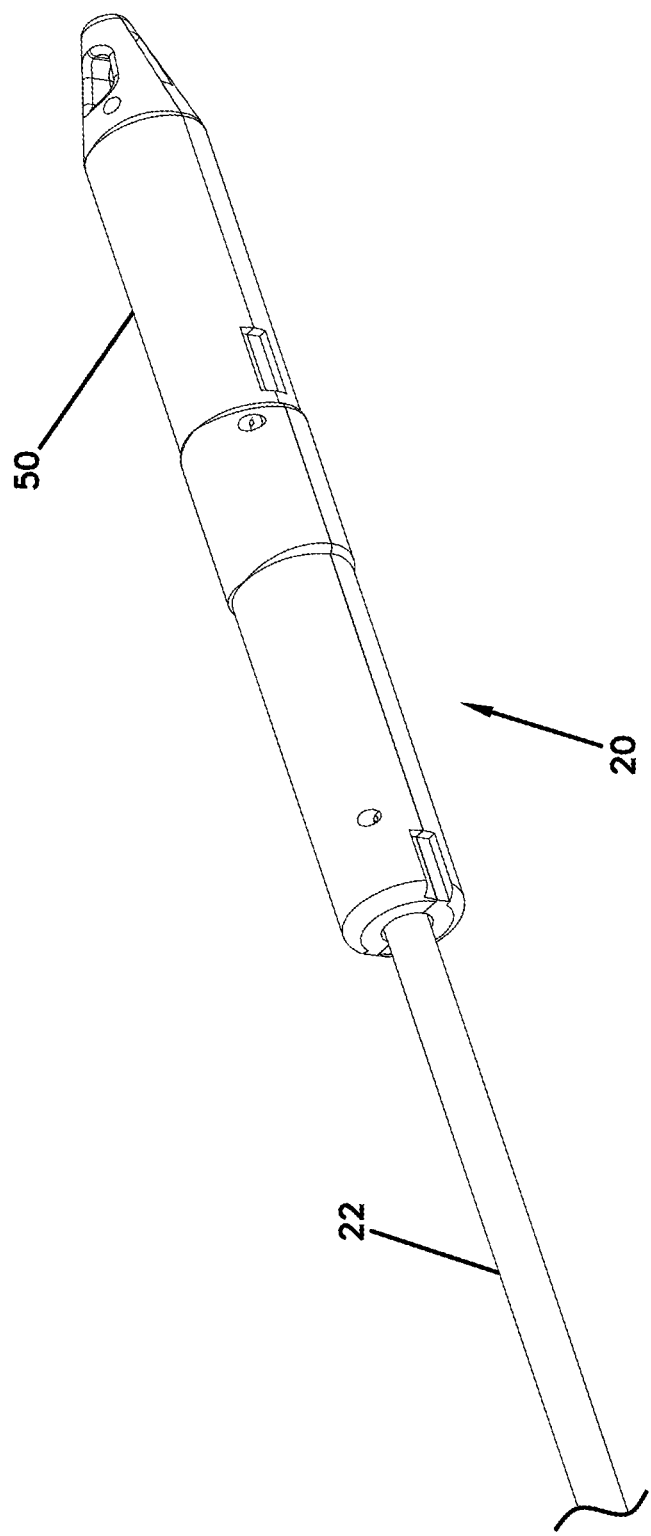
FIG. 5 shows the factory terminated subassembly of FIG. 1 fully enclosed within the carrier.

Referring to FIGS. 4 and 5, a casing 50 can be installed over the ferrule assembly 26 and the spring 24 in the factory. The casing 50 can be configured to protect the ferrule assembly 26 and the spring 24 as the fiber optic cable 22 is pushed or pulled through a duct. Additionally, the casing 50 can include an eye 52 (i.e., an opening) for facilitating connecting the casing 50 to a pulling or pushing member. Moreover, a front end 54 of the casing 50 can be rounded to facilitate directing the casing 50 through curved paths defined by ducts.

Figure 6:
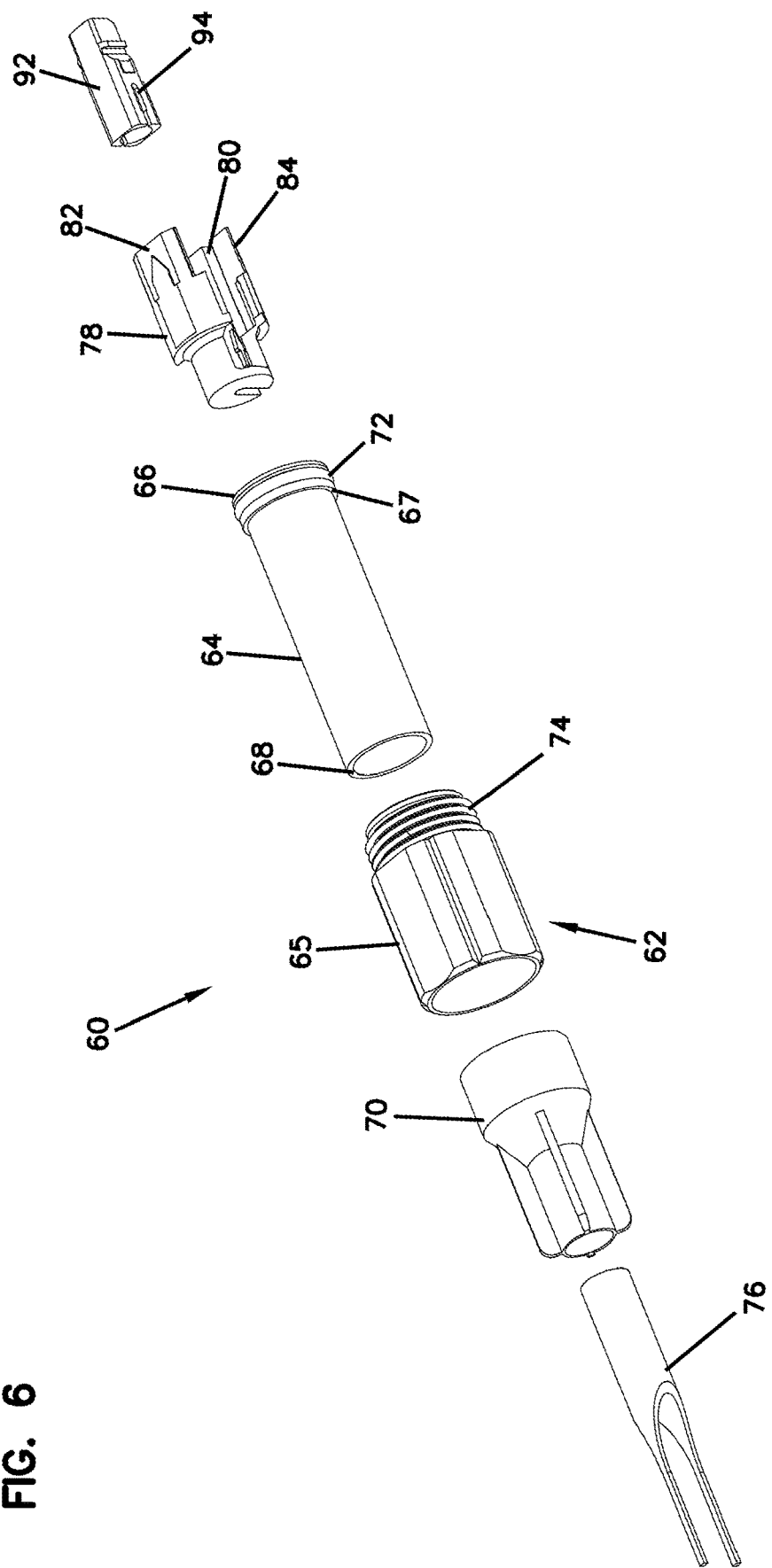
FIG. 6 shows a kit for a field installable subassembly for converting the factory terminated subassembly of FIG. 1 into a hardened fiber optic connector.

FIG. 6 shows a kit 60 including a field installable subassembly 62 adapted to be mounted over the factory terminated subassembly 20. The field installable subassembly 62 is adapted to convert the factory terminated subassembly 20 into a hardened fiber optic connector. The field installable subassembly 62 includes housing 64 having a front end 66 and a back end 68. In one example, the housing can be generally cylindrical. In use, the housing 64 can function as a sealed housing. An elastomeric sealing sleeve 70 is mounted over the back end 68 of the housing 64 so as to provide a seal therewith. In certain examples, the elastomeric sealing sleeve 70 has an elastomeric construction. In one example, the elastomeric sealing sleeve 70 has a composition that includes a material such as silicone rubber. An annular seal 72 is also provided adjacent the front end of the housing. The seal 72 can be mounted within a groove 73 defined by the housing 64.

The subassembly 62 also includes a hardened coupling element 65 mounted on the housing 64. In certain examples, the coupling element 65 can turn (i.e., rotate) relative to the housing 64 about a longitudinal axis of the housing 64. The hardened coupling element 65 further includes a twist-to-lock coupling interface 74. As depicted, the twist-to-lock coupling interface 74 includes a plurality of external threads adapted to mate with corresponding internal threads 89 of a hardened fiber optic adapter 90 (see FIG. 16). In other examples, the twist-to-lock coupling interface can include a bayonet-type interface, a partial threaded interface or other types of robust coupling interfaces. A front end of the coupling element 65 abuts against a shoulder 67 of the housing 64 near the front end of the housing 64

The fiber optic adapter 90 includes a first port 91 for receiving a first fiber optic connector (e.g., the hardened connector that results from the combination of the factory terminated subassembly 20 and the field installable sub assembly 62) and an opposite second port 92 for receiving a second fiber optic connector. The internal threads 89 are defined within the first port 91. An adapter sleeve (not shown) for aligning the ferrules of the connectors is positioned within the fiber optic adapter 90. When the first and second connectors are mounted within the first and second ports 91, 92, the ferrules of the first and second connectors are received in the adapter sleeve and co-axially aligned with one another such that optical signals can be transferred between the first and second connectors. Further details regarding the fiber optic adapter 90 are disclosed in U.S. Pat. No. 6,579,014 that is hereby incorporated by reference in its entirety.

A seal expansion tube 76 is pre-inserted through a back end of the elastomeric sealing sleeve 70 and into the interior of the housing 64. The seal expansion tube 76 preferably has an inner diameter that is larger than a maximum transverse cross-sectional dimension of the ferrule assembly 26 and is also larger than a maximum transverse cross-sectional dimension of the protective casing 50. Thus, the seal expansion tube 76 retains a rear end of the elastomeric sealing sleeve 70 in an enlarged orientation so that the elastomeric sealing sleeve 70 does not interfere with insertion of the factory terminated subassembly 20 through the housing 64. It will be appreciated that the elastomeric sealing sleeve 70 has a physical construction that elastically urges the elastomeric sealing sleeve 72 toward an orientation in which an inner diameter defined by the elastomeric sealing sleeve 70 is smaller than an outer diameter of the fiber optic cable 22. Therefore, once the seal expansion tube 76 is removed from the elastomeric sealing sleeve 70, the elastomeric sealing sleeve 70 elastically returns to a constricted orientation in which the elastomeric sealing sleeve 70 is capable of forming a fluid tight seal about the exterior of the fiber optic cable 22.

The field installable subassembly 62 further includes a plug locator 78 that mounts within the front end 66 of the housing 64. The plug locator 78 can include a longitudinal slot 80 that extends through the length of the plug locator 78. The longitudinal slot is configured to allow the plug locator 78 to be inserted laterally over the fiber optic cable 22. The plug locator 78 further includes opposite paddles 82 and 84 that provide a keying function when the fiber optic connector is mated with its corresponding fiber optic adapter 90 (see FIG. 16). The plug locator 78 further includes a plug mount 86 adapted to coaxially align with a central axis of the hardened coupling element 64. The plug mount 86 defines a through slot 88 for allowing the fiber optic cable 22 to pass laterally into an interior of the plug mount 86. The plug mount 86 further includes one or more snap-fit structures 90. In certain examples, the plug mount 86 can also include a surface 87 that functions as a spring stop.

Referring back to FIG. 6, the field installable subassembly 62 further includes a plug body 92. In certain examples, the plug body 92 can have an SC type form factor. The plug body 92 includes one or more snap-fit structures 94 that mate with the snap-fit structures 90 of the plug mount 86. The interior of the plug body 92 can include a receptacle having a transverse cross-sectional shape that matches the transverse cross-sectional shape of the flange 42 of the ferrule hub 30. The ferrule subassembly 26 can be loaded into the back side of the plug body 92 and into the receptacle with the tuning mark located at a predetermined position relative to the plug body 92 so that the connector is tuned. The mating relationship between the transverse cross-sectional shape of the flange 42 of the ferrule hub 30 and the receptacle of the plug body 92 prevents relative rotation between the ferrule assembly 26 and the plug body 92. When the ferrule assembly 26 is inserted into the back side of the plug body 92, the ferrule 28 extends through an opening in a front face of the plug body 92 and a front end surface of the ferrule hub 30 nests within a corresponding seat defined within the plug body 92. The plug body 92 can have an exterior form factor adapted to be compatible with a corresponding fiber optic adapter. As indicated above, the form factor can be an SC form factor.

Figure 7:
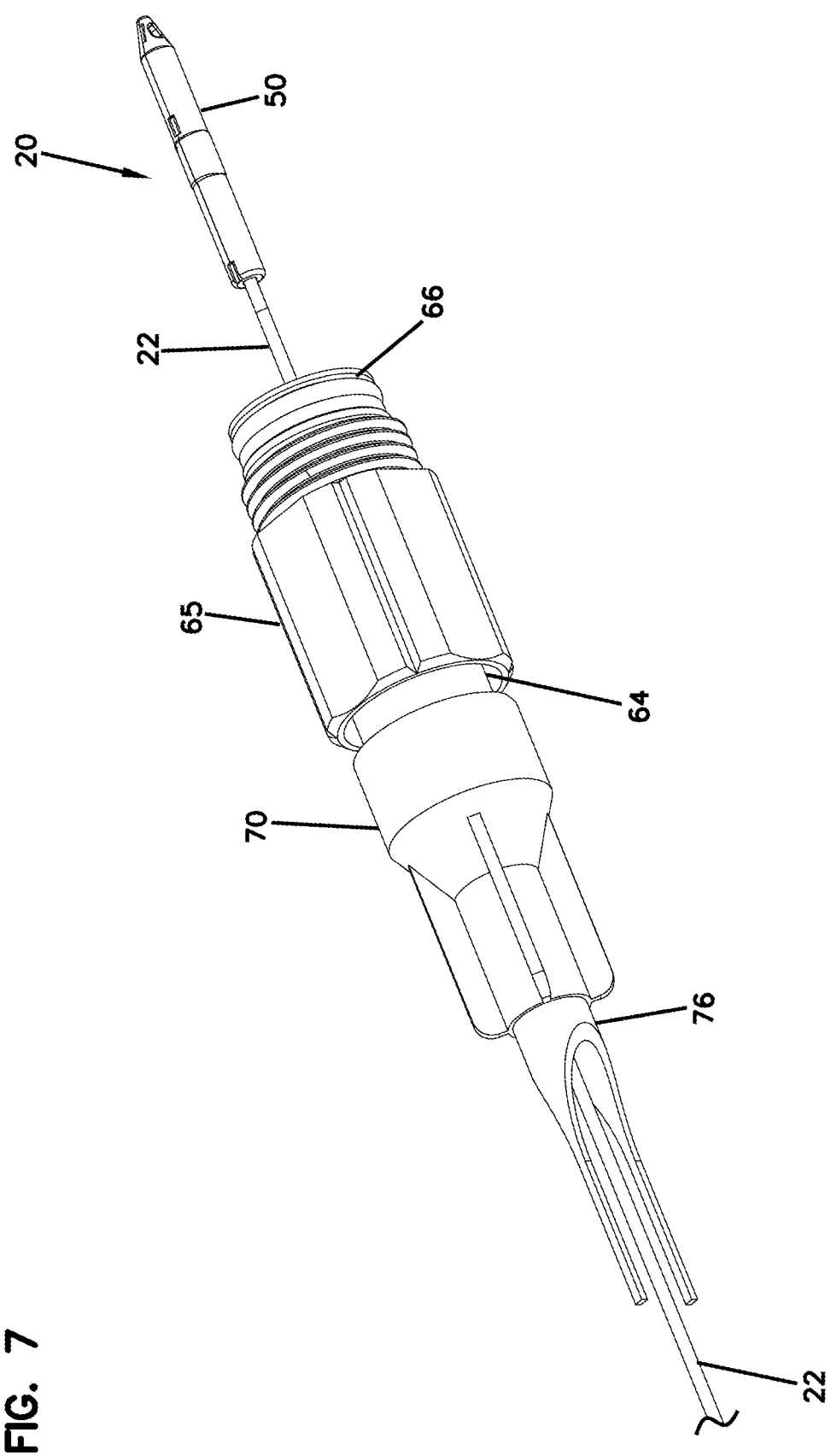
FIG. 7 shows a first installation step for installing the field installable subassembly of FIG. 6 over the factory terminated subassembly of FIG. 1, the factory terminated subassembly is shown inserted through a hardened coupling element.
Figure 8:
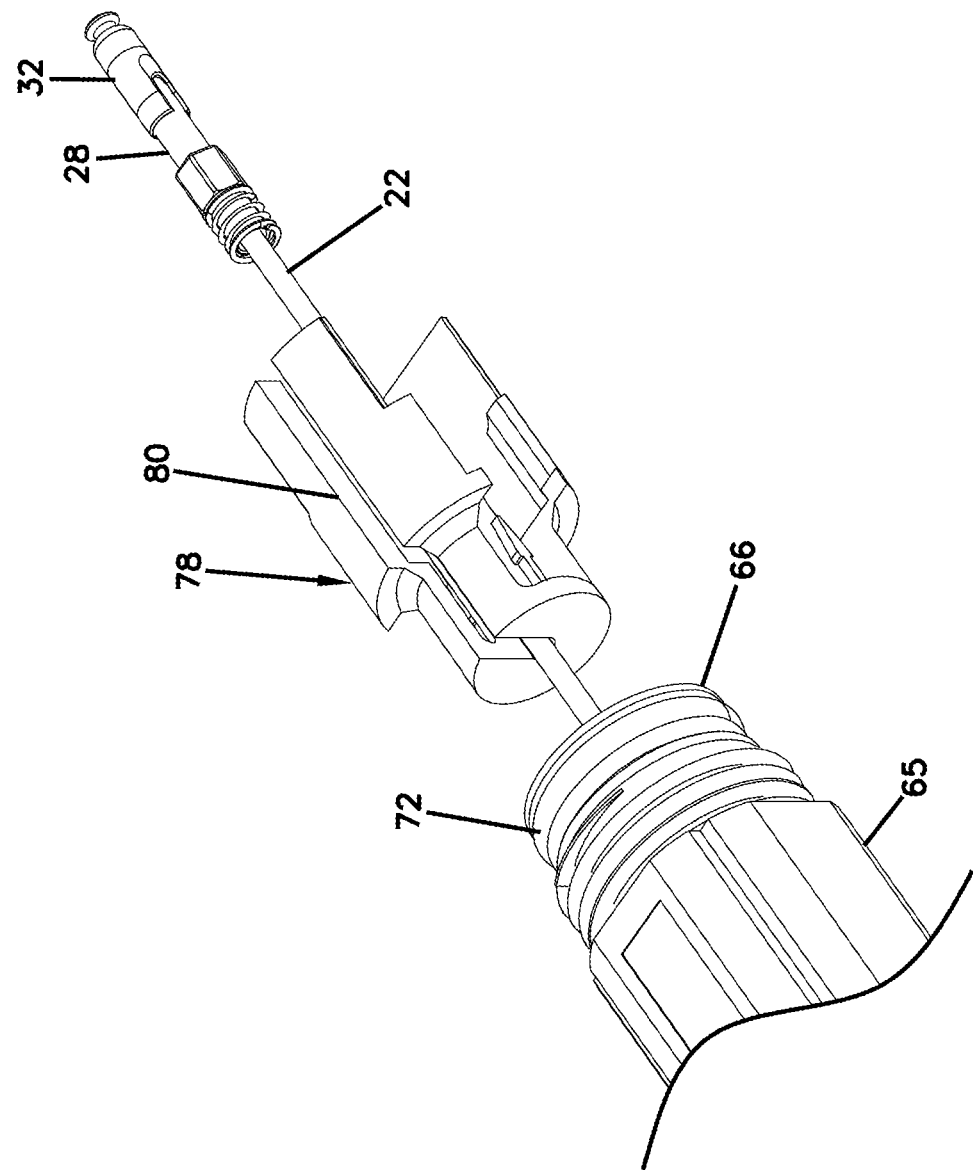
FIG. 8 shows a second step installing the field installable subassembly of FIG. 6 over the factory terminated subassembly of FIG. 1, a plug locator is shown inserted over an optical cable of the factory terminated subassembly.
Figure 9:
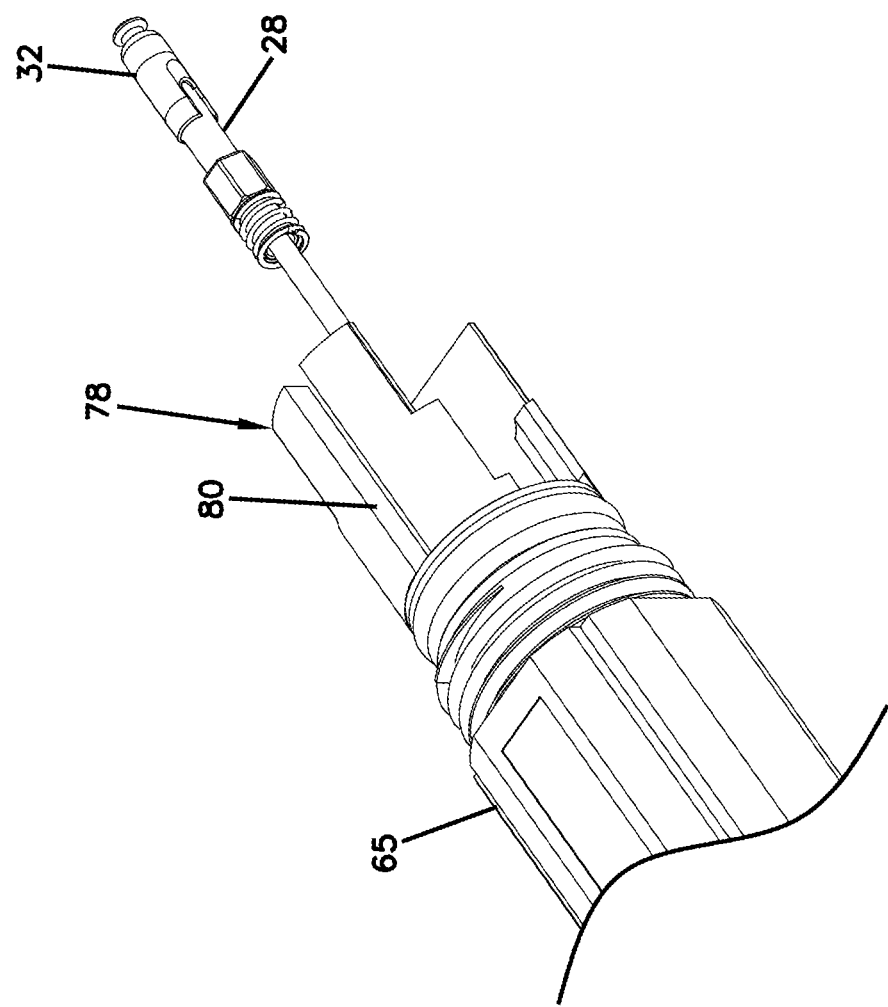
FIG. 9 shows a third step for installing the field installable subassembly of FIG. 6 over the factory terminated subassembly of FIG. 1, the plug locator is shown inserted into a front end of the hardened coupling element.
Figure 10:
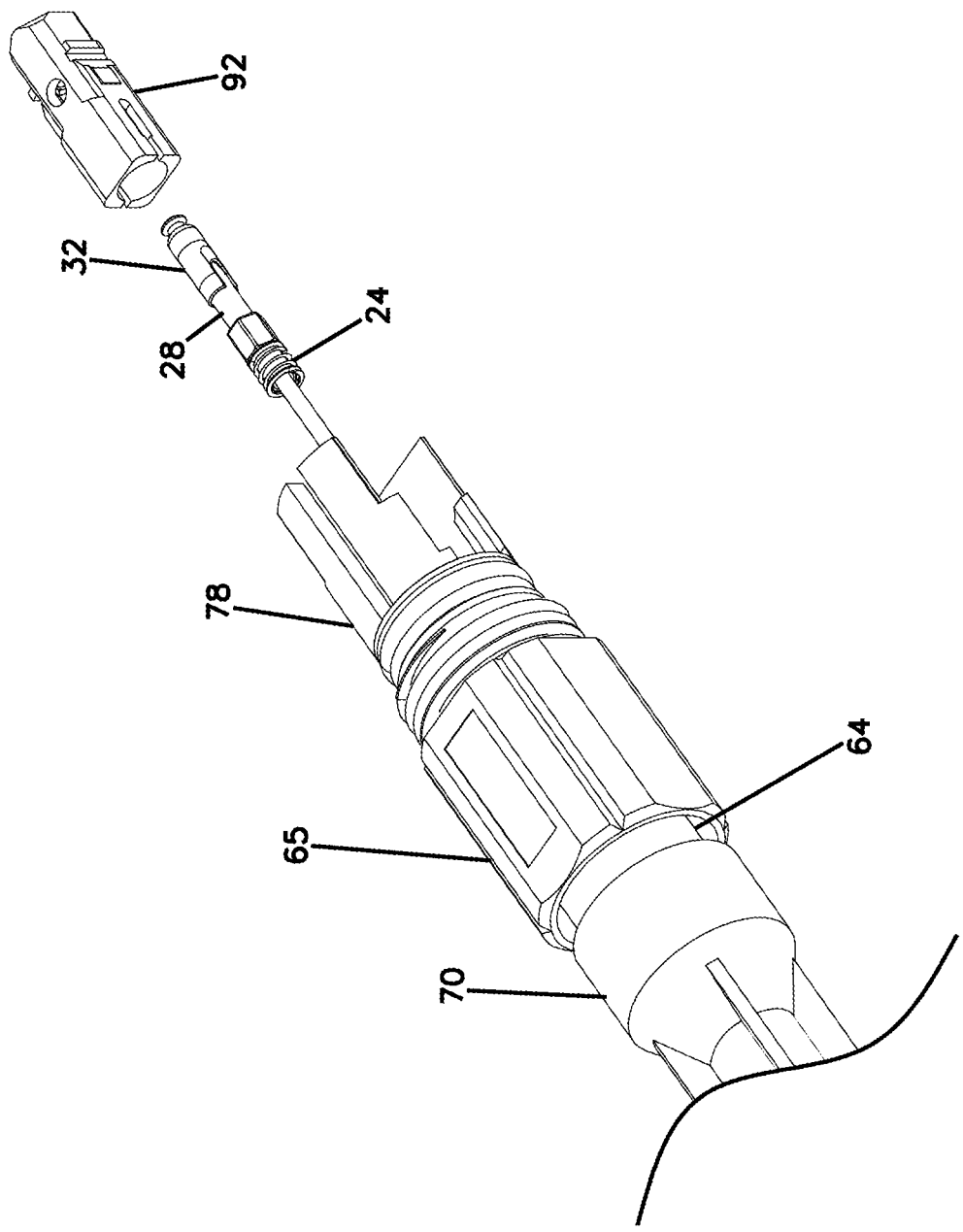
FIG. 10 shows a fourth step for installing the field installable subassembly of FIG. 6 over the factory terminated subassembly of FIG. 1, in this step a plug body is shown placed in coaxial alignment with the factory terminated subassembly.
Figure 11:
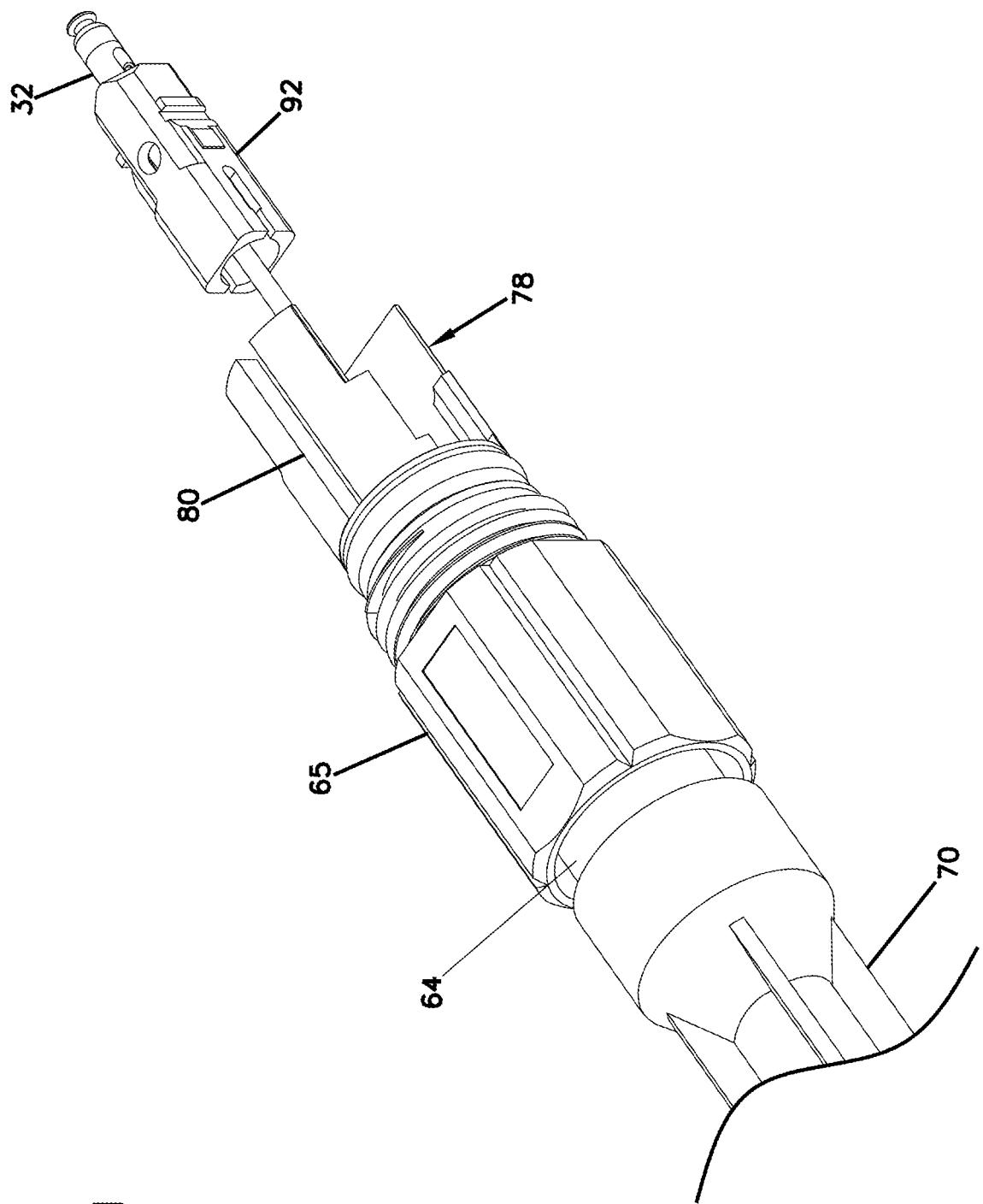
FIG. 11 shows a fifth step for installing the field installable subassembly of FIG. 6 over the factory terminated subassembly of FIG. 1, the plug body is shown inserted over the factory terminated subassembly such that the ferrule of the factory terminated subassembly protrudes through a front end of the plug body.
Figure 12:
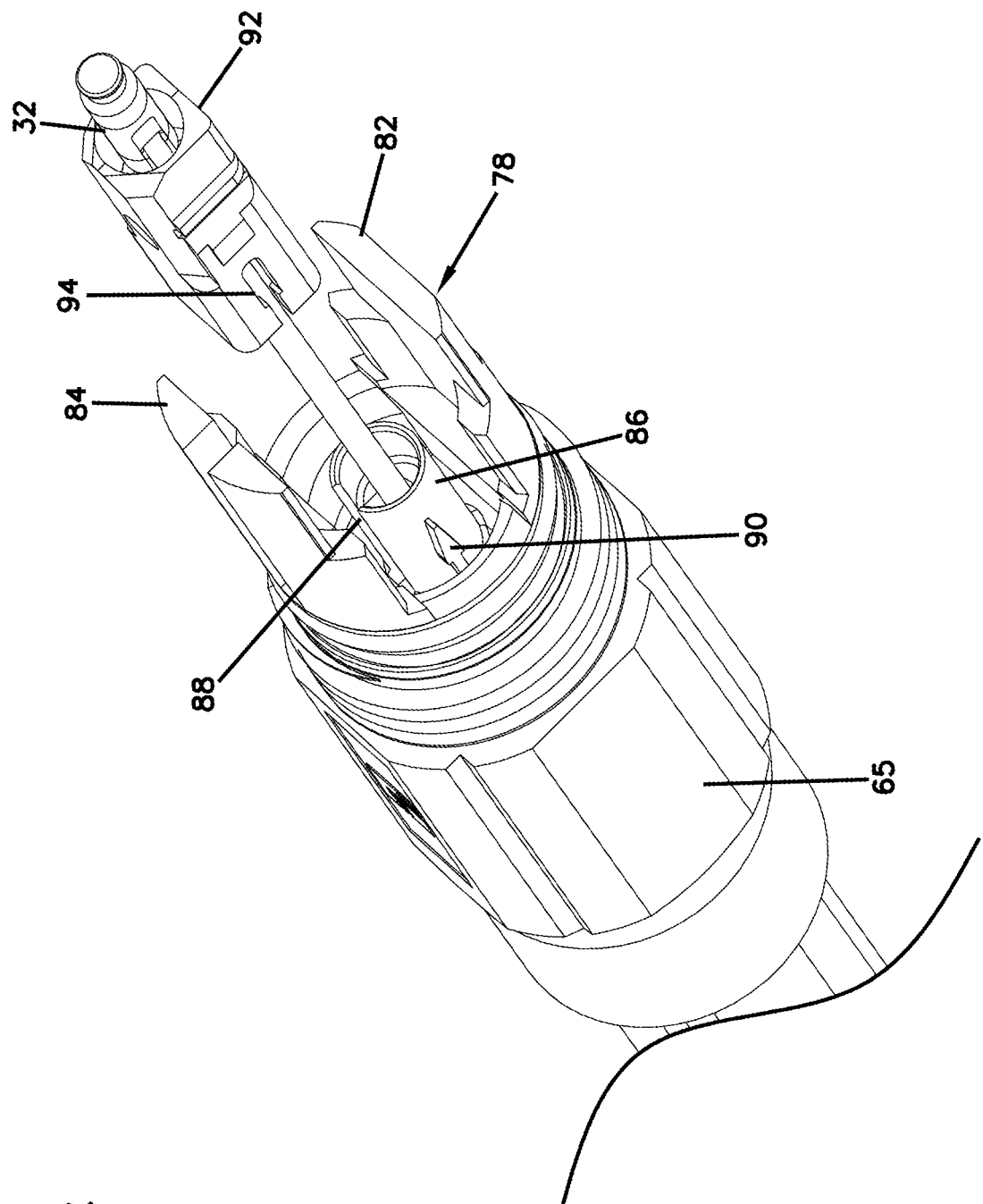
FIG. 12 shows a sixth step for installing the field installable subassembly of FIG. 6 over the factory terminated subassembly of FIG. 1, in this step the plug body is placed in coaxial alignment with a plug mount defined by the plug locator.
Figure 13:
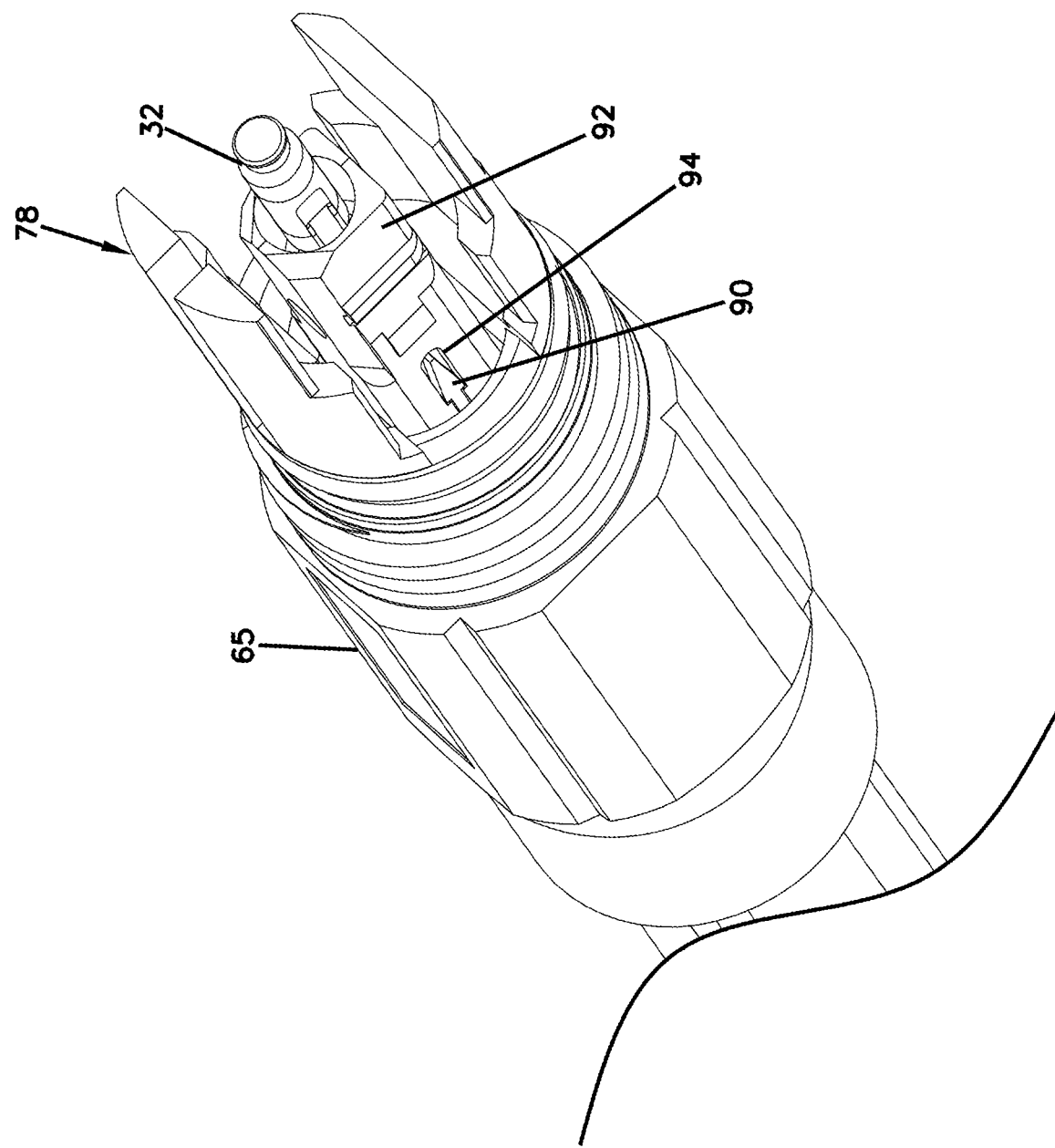
FIG. 13 shows a seventh step for installing the field installable subassembly of FIG. 6 over the factory terminated subassembly of FIG. 1, in this step the plug body is snapped over the plug mount of the plug locator.
Figure 14:
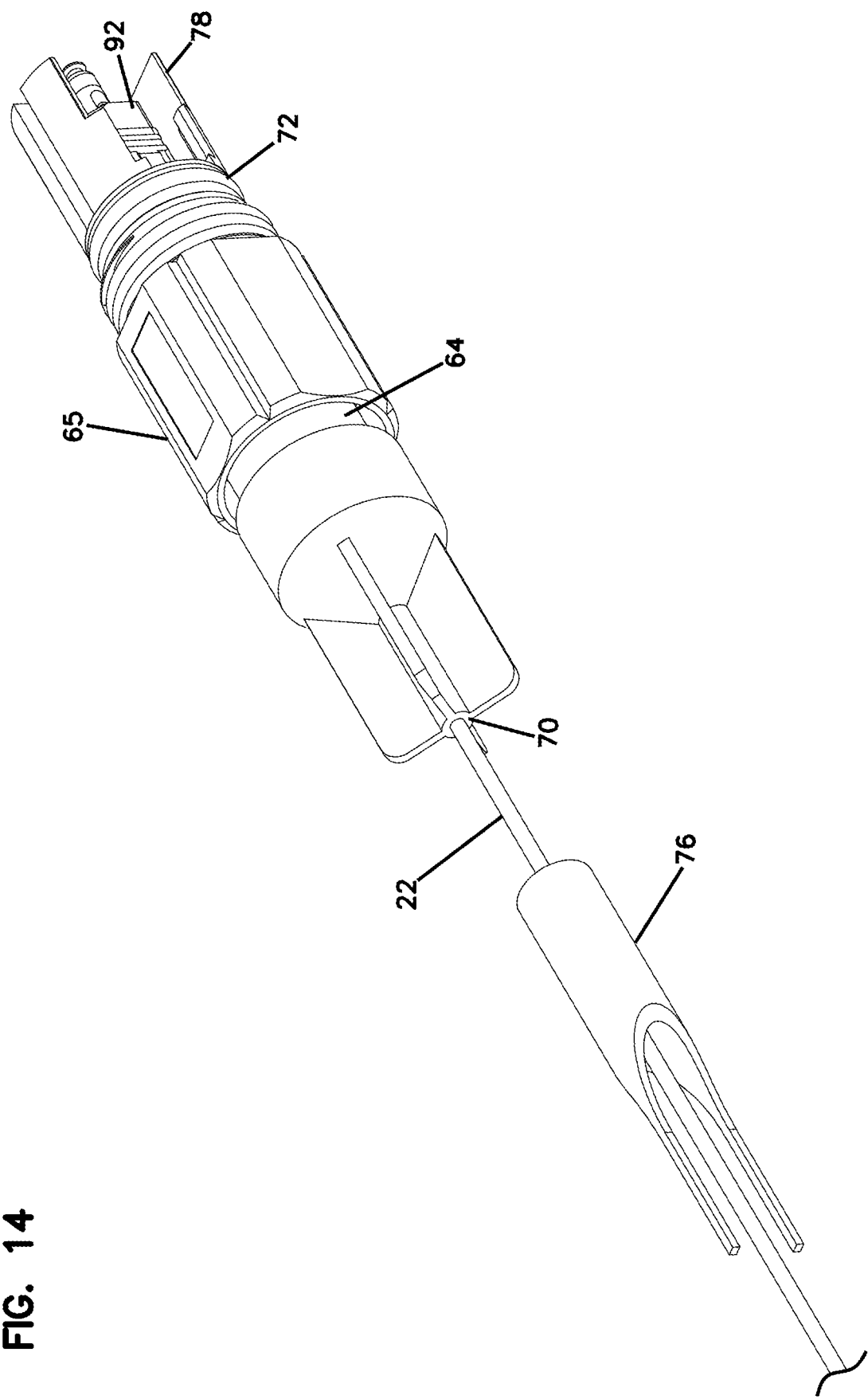
FIG. 14 shows an eighth step for installing the field installable subassembly of FIG. 6 over the factory terminated subassembly of FIG. 1, in this step a seal enlargement tube has been removed from a back end of an elastomeric seal mounted at a rear end of the hardened coupling element thereby allowing the elastomeric seal to elastically radially constrict upon the optical fiber cable of the factory terminated subassembly so as to provide a seal between the hardened coupling element and the fiber optic cable.
Figure 26:
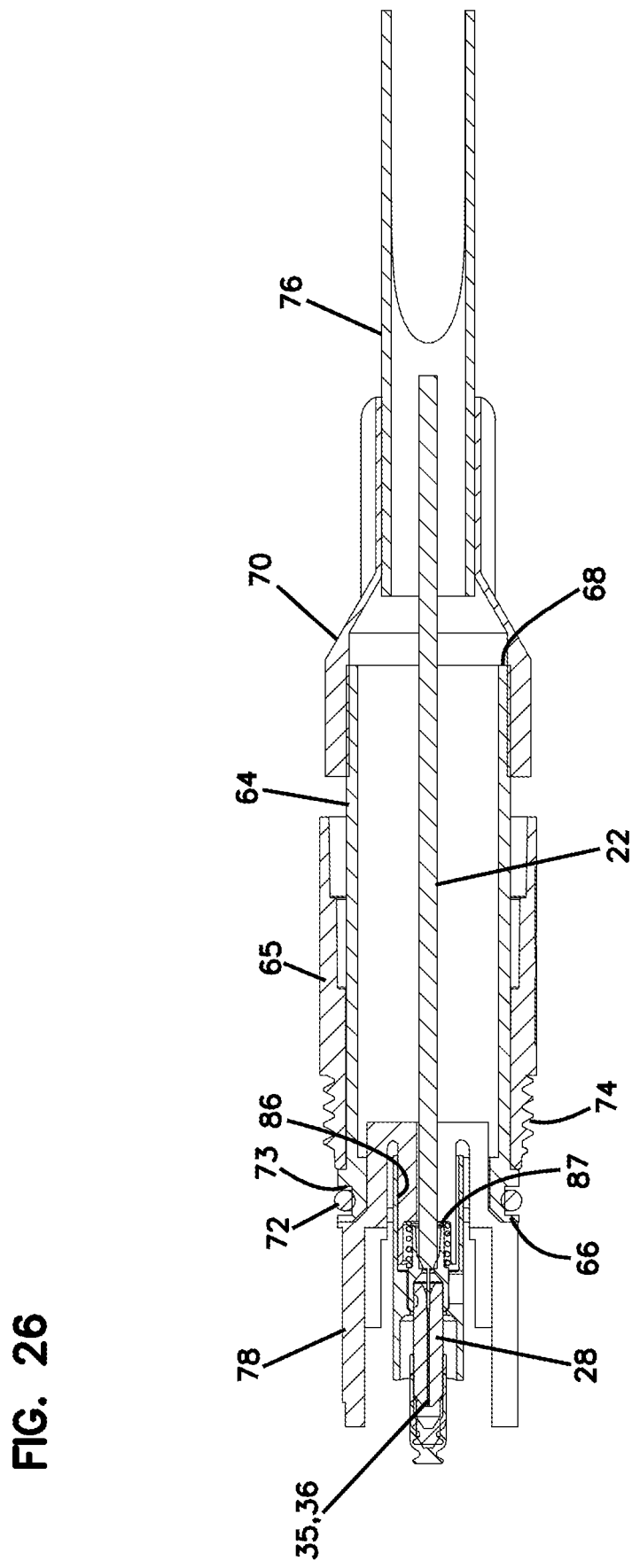
FIG. 26 is a cross sectional view of the field installable subassembly of FIGS. 6-14 installed over the factory terminated subassembly of FIG. 1.

FIGS. 7-14 illustrate a sequence of steps for installing the field installable subassembly 62 over the factory terminated subassembly 20. Referring to FIG. 7, the factory terminated subassembly 20 is inserted in a rearward to forward direction through the interior of the housing 64. It will be appreciated that the seal expansion tube 76 holds the elastomeric sealing sleeve 70 open, and that the inner diameter of the seal expansion tube 76 is large enough to allow the factory terminated subassembly 20 to pass through. Once the factory terminated subassembly 20 has passed through the housing 64, the casing 50 is removed and the plug locator 78 is inserted over the fiber optic cable 22 at a position between the front end of the housing 64 and the ferrule assembly 26 (see FIG. 8). The longitudinal slot 80 defined by the plug locator 78 allows the fiber optic cable 22 to be laterally inserted into the plug locator 78. The insertion process also includes inserting the fiber optic cable 22 laterally through the through slot 88 defined by the plug mount 86. Once the fiber optic cable 22 has been centrally located within the plug locator 78, the plug locator 78 can be inserted into the front end of the housing 64. It will be appreciated that a rear portion of the plug locator 78 fits within the housing 64 and a shoulder 79 abuts against a front end face of the housing 64 (see FIGS. 9 and 26).

With the plug locator 78 in place, the plug body 92 is then coaxially aligned in front of the ferrule assembly 26 (see FIG. 10) and subsequently moved rearwardly relative to the ferrule assembly 26 such that the ferrule assembly 26 is received within the interior of the plug body 92. As indicated above, the ferrule assembly 26 is preferably oriented at a tuned relation relative to the plug body 92. With the ferrule assembly 26 received within the plug body 92, the plug body 92 is inserted rearwardly over the plug mount 86 of the plug locator 78. As the plug body 92 is moved axially over the plug mount 86, the snap-fit structures 92 of the plug mount 86 snap within the snap-fit structures 94 of the plug body 92 to provide a secure connection. Additionally, the surface 87 opposes a rear end of the spring 24 so as to function as a spring stop. Thus, the spring 24 is captured between the surface 87 and the flange of the ferrule hub 30.

Figure 16:
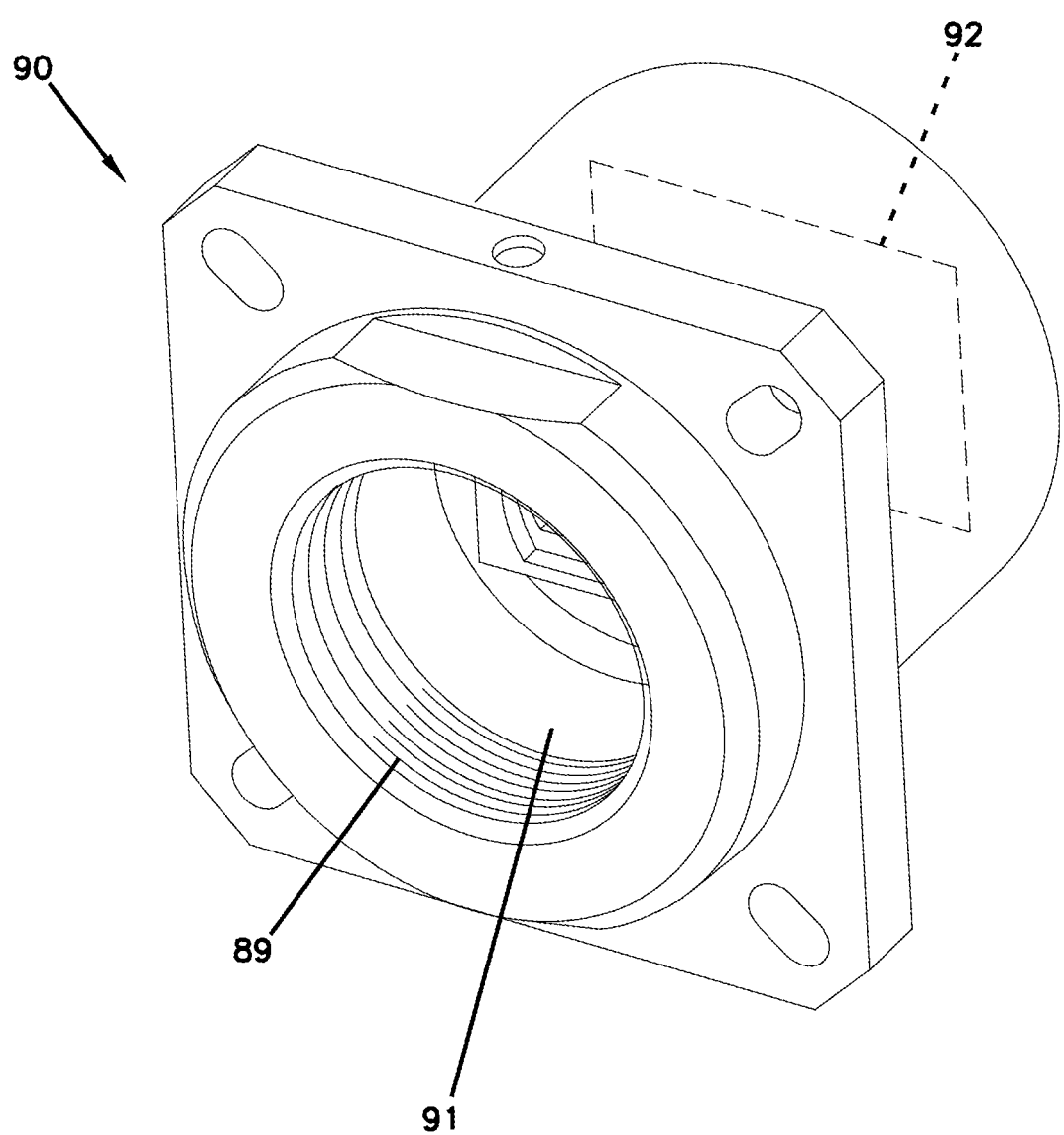
FIG. 16 illustrates an example of a ruggedized fiber optic adapter configured to mate with the assembled hardened fiber optic connector of FIG. 14.

Once the plug body 92 is mounted to the plug mount 86, the dust cap 32 can be removed from the ferrule 28 and connector can be inserted into the first port 91 of the hardened fiber optic adapter 90 (see FIG. 16). As the connector is inserted into the first port 91 of the hardened fiber optic adapter, the ferrule 28 can be received within a ferrule alignment sleeve of the adapter. Additionally, the plug body 92 and the paddles 82, 84 can mate with corresponding receptacles within the interior of the hardened fiber optic adapter 90 to ensure that a proper rotational orientation is maintained between the hardened fiber optic connector and the hardened fiber optic adapter 90. Thereafter, the hardened coupling element 64 can be turned relative to the fiber optic cable 22, the housing 64 the plug locator 78 and the plug body 92 such that the threads engage the corresponding threads 89 within the hardened fiber optic adapter. Once the hardened coupling element 64 has been fully threaded into the hardened fiber optic adapter 90, the seal expansion tube 76 can be axially pulled from within the interior of the elastomeric sealing sleeve 70 such that the elastomeric sealing sleeve elastically constricts down upon the fiber optic cable 22 to provide a seal with the cable 22.

Figure 15:
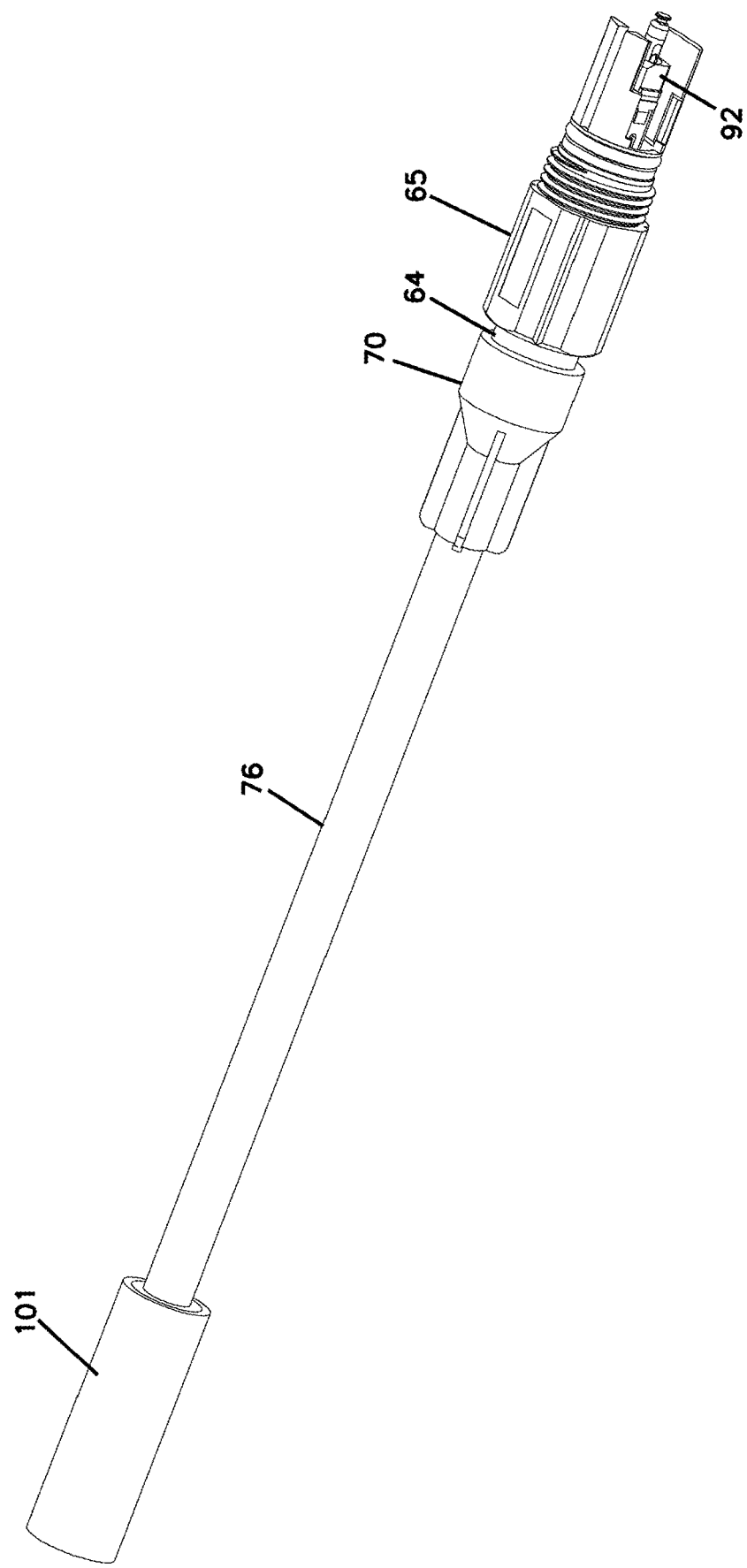
FIG. 15 shows an alternative seal enlargement tube having an elongated length suitable for providing mechanical protection across a transition between the back end of the elastomeric seal and a duct.

In certain examples, the seal expansion tube 76 can be cut from the cable 22. In other examples, the seal expansion tube can remain on the cable 22 to provide protection. In the example of FIG. 15, the tube 76 can be long enough to extend from the rear of the housing to a duct 101 through which the fiber optic cable 22 had been routed.

Figure 17:
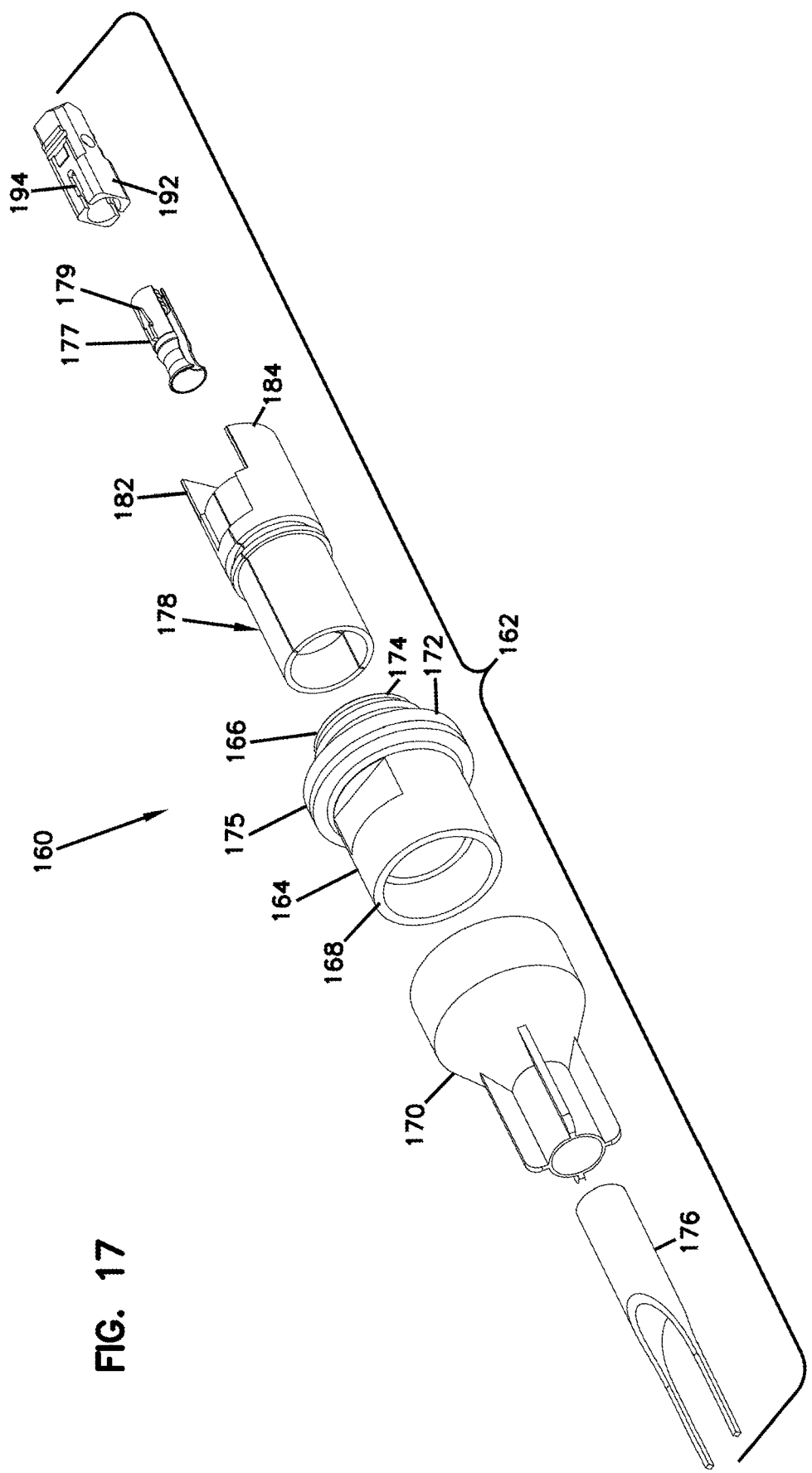
FIG. 17 illustrates another kit for a field installable subassembly adapted to be mounted over the factory terminated subassembly of FIG. 1.

FIG. 17 shows another kit 160 for a field installable subassembly 162 adapted to be mounted over the factory terminated subassembly 20 to convert the factory terminated subassembly 20 into a hardened fiber optic connector. Similar to the embodiment of FIGS. 6-14, the hardened fiber optic connector that results from the kit 160 is adapted to mate with a hardened fiber optic adapter such as the fiber optic adapter 90 of FIG. 16. It will be appreciated that while both examples of hardened connectors disclosed herein have paddles, other examples may not have paddles. In certain examples, kits can be utilized so as to convert the factory terminated subassembly 20 into a hardened fiber optic connector of the type disclosed at U.S. Pat. No. 7,744,288, which is hereby incorporated by reference in its entirety.

Referring to FIG. 17, the field installable subassembly 162 includes a hardened coupling element 164 having a front end 166 and a back end 168. An elastomeric sealing sleeve 170 of the type previously described is mounted at the back end 168 of the hardened coupling element 164. A twist-to-lock coupling interface 174 is positioned at the front end 166 of the hardened coupling element 64. As depicted, the twist-to-lock coupling interface 174 is shown as threads. In other examples, other types of interfaces such as a bayonet-type interface could be used. The twist-to-lock coupling interface 174 in the form of form of threads extends from the front end 166 of the hardened coupling element 164 to an outer shoulder 175 of the hardened coupling element 164. An annular seal 172 such as a face seal is mounted around the hardened coupling element 164 adjacent the outer shoulder 175. The annular seal 172 abuts against a forwardly facing surface of the outer shoulder 175.

Referring still to FIG. 17, the field installable subassembly 162 also includes a plug body 192 having the same basic construction as the plug body 92 and a rear housing 177 adapted to be secured to a rear end of the plug body 92. In certain examples, the plug body 192 has a snap-fit structure 194 that engages a corresponding snap-fit structure 179 defined by the rear housing 177. The rear housing 177 also functions as a spring stop with the spring 24 being captured between a surface of the rear housing 177 and the flange 42 of the ferrule hub 30. The field installable subassembly 162 further includes a plug locator 178 having two mating pieces between which the plug body 192 and the rear housing 177 are mounted. The plug locator 178 includes opposite paddles 182, 184. The plug locator 178 also includes a radial shoulder 181 that abuts against a front end of the hardened coupling element 164 when the plug locator 178 is loaded into the hardened coupling element 164. A seal expansion tube 176 is provided within the back end of the elastomeric sealing sleeve 70 to hold the elastomeric sealing sleeve open until after the assembly and installation process has been completed.

It will be appreciated that the hardened coupling element 164 functions as a sealed outer housing. For example, the rear end of the hardened coupling element 164 is sealed relative to the fiber optic cable 22 by the elastomeric sealing sleeve 170 and the front end of the hardened coupling element 164 is sealed relative to the fiber optic adapter by the annular seal 172. In certain examples the annular seal 172 is an axial face seal. In other examples, annular seal 172 can be a radial seal.

Figure 18:
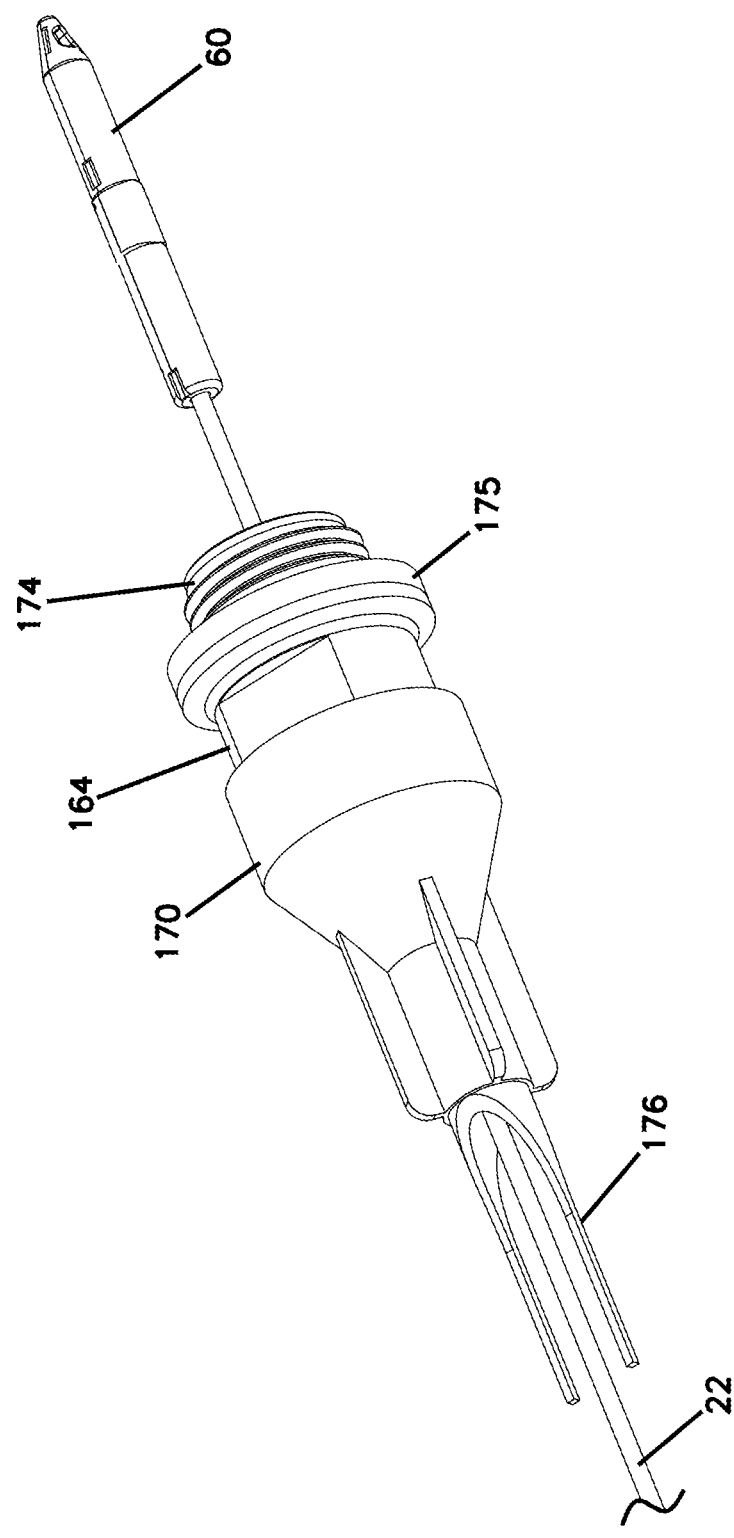
FIG. 18 is a first step for installing the field installable subassembly of FIG. 17 over the factory terminated subassembly of FIG. 1, in this step a hardened coupling element is inserted over the factory terminated subassembly.

FIGS. 18-24 show an assembly process for assembling the field installable subassembly 162 over the factory terminated subassembly 20. Referring to FIG. 18, the factory terminated subassembly 20 is initially inserted through the interior of the seal expansion tube 176 and through the interior of the hardened coupling element 164. As previously described, the seal expansion tube 176 has an inner diameter that is larger than a maximum outer cross-sectional dimension of the factory terminated subassembly 20. The seal expansion tube 176 holds the elastomeric sealing sleeve 170 open to a position large enough where the factory terminated subassembly 20 can readily be passed through the hollow passage of the hardened coupling element 164 without interference from the elastomeric sealing sleeve 170.

Figure 19:
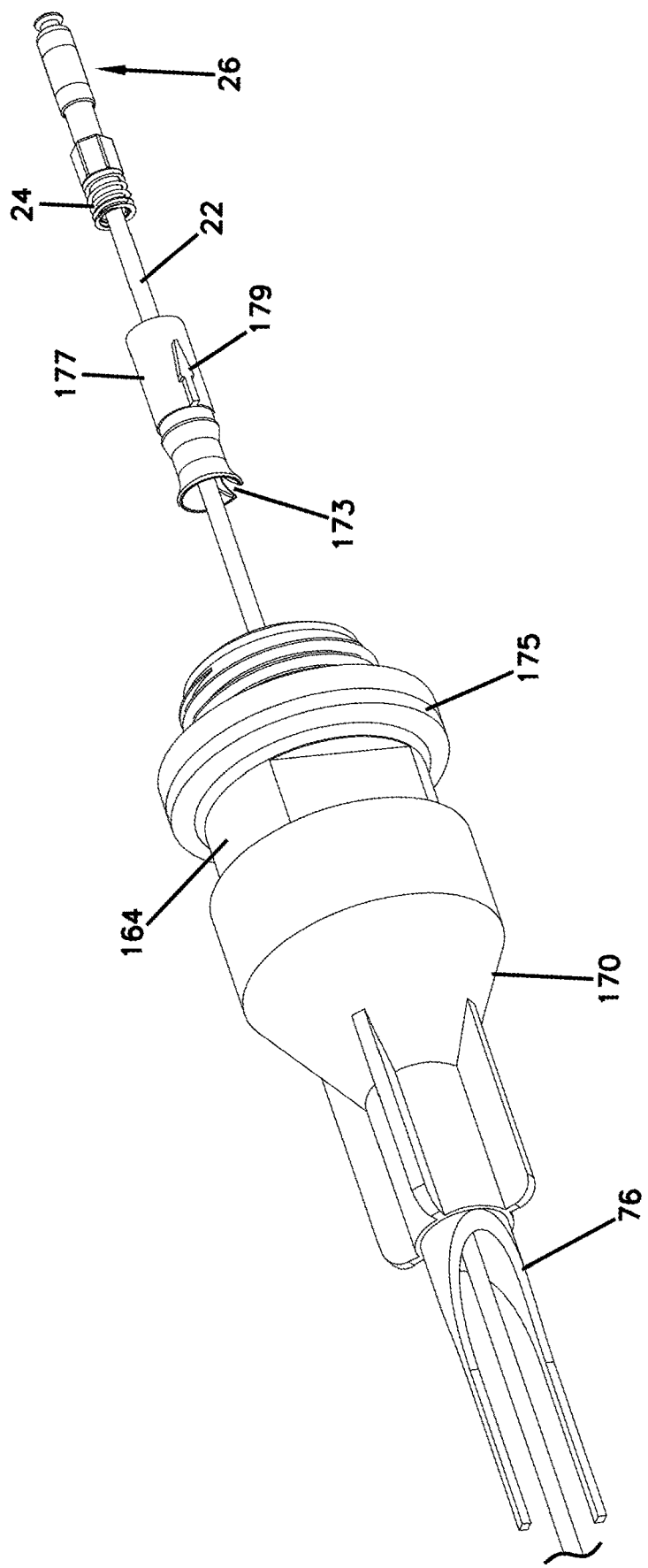
FIG. 19 shows a second step for installing the field installable subassembly of FIG. 17 over the factory terminated subassembly of FIG. 1, in this step a rear connector housing has been mounted over the fiber optic cable of the factory terminated subassembly of FIG. 1.
Figure 20:
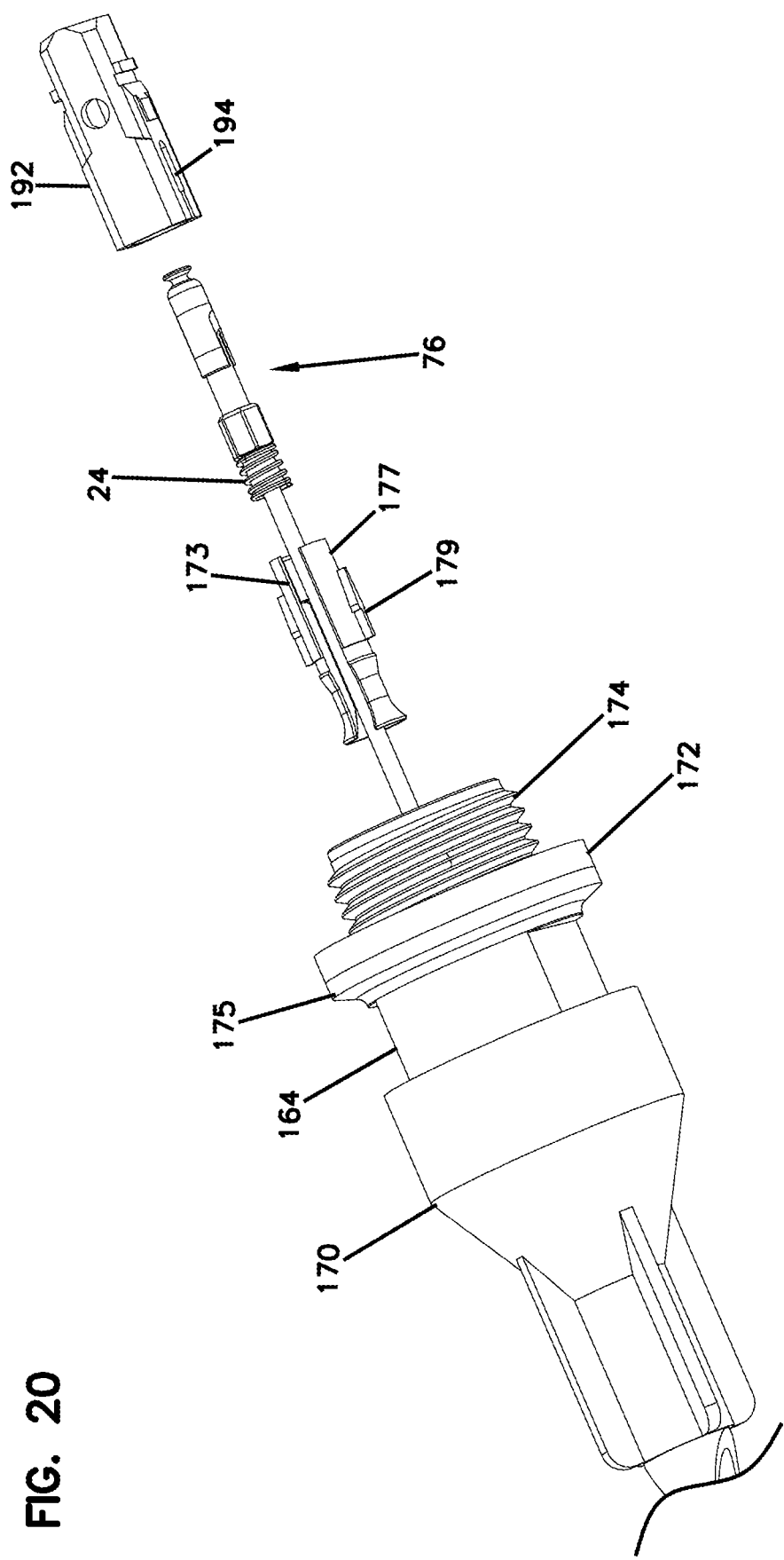
FIG. 20 illustrates a third step for installing the field installable subassembly of FIG. 17 over the factory terminated subassembly of FIG. 1, in this step a plug body is placed in coaxial alignment with the factory terminated subassembly.
Figure 21:
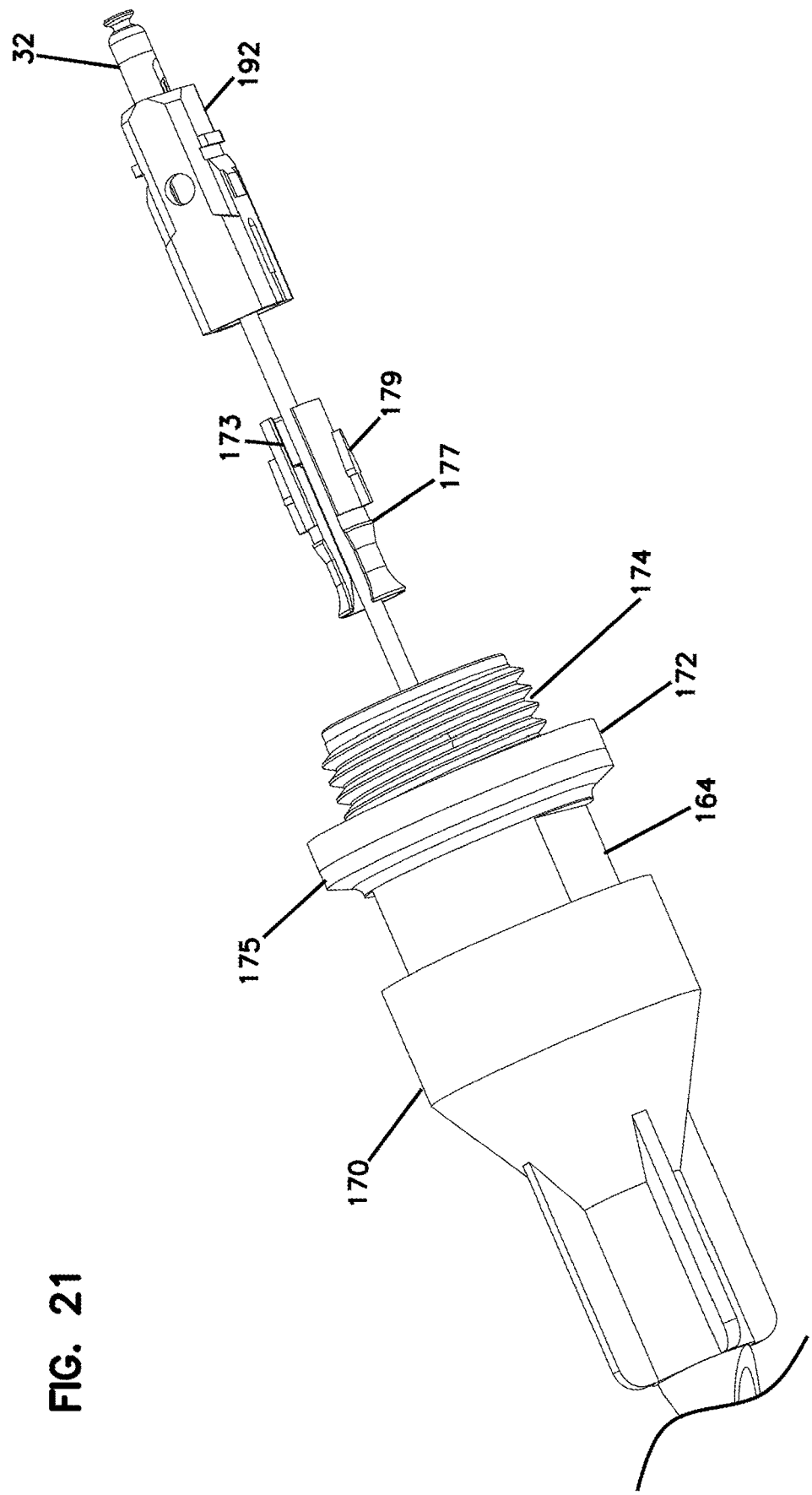
FIG. 21 illustrates a fourth step for installing the field installable subassembly of FIG. 17 over the factory terminated subassembly of FIG. 1, in this step the plug body is inserted over the factory terminated subassembly such that a ferrule of the factory terminated subassembly projects through a front end of the plug body.
Figure 22:
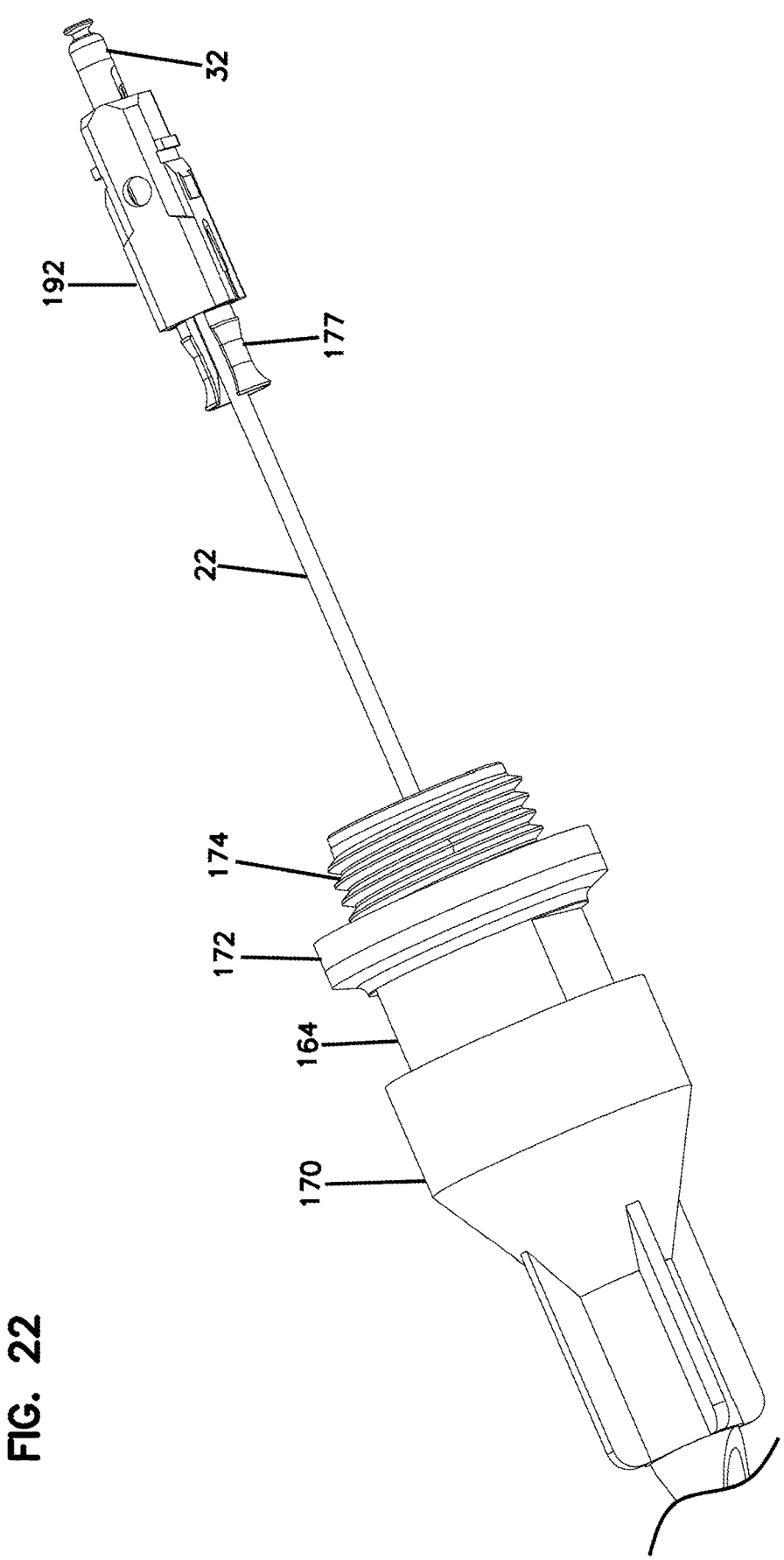
FIG. 22 shows a fifth step for installing the field installable subassembly of FIG. 17 over the factory terminated subassembly of FIG. 1, in this step the rear housing is secured to the plug body with the rear housing functioning as a spring stop.
Figure 23:
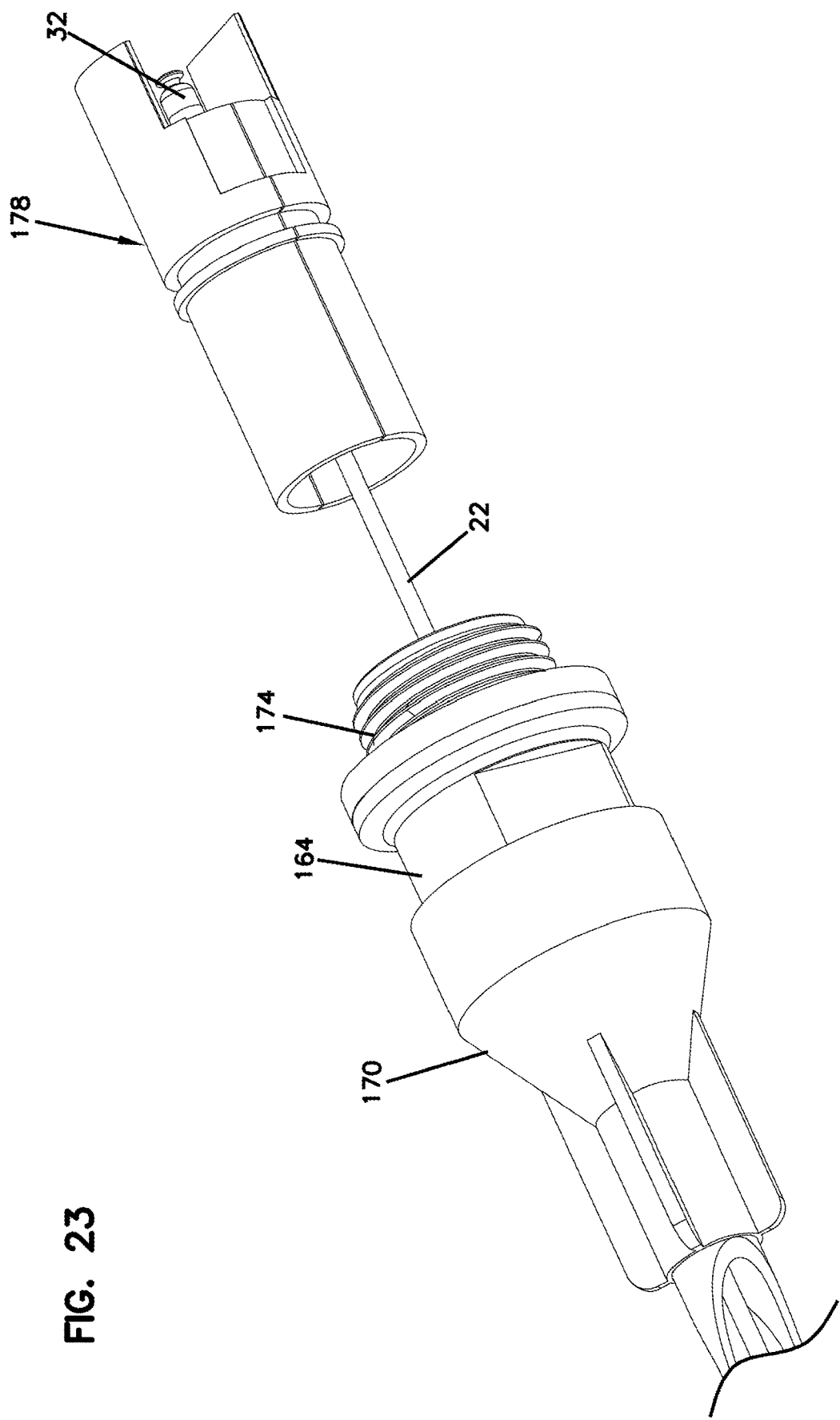
FIG. 23 shows a sixth step for installing the field installable subassembly of FIG. 17 over the factory terminated subassembly of FIG. 1, in this step a plug locator is mounted over the assembled plug body and rear housing.
Figure 24:
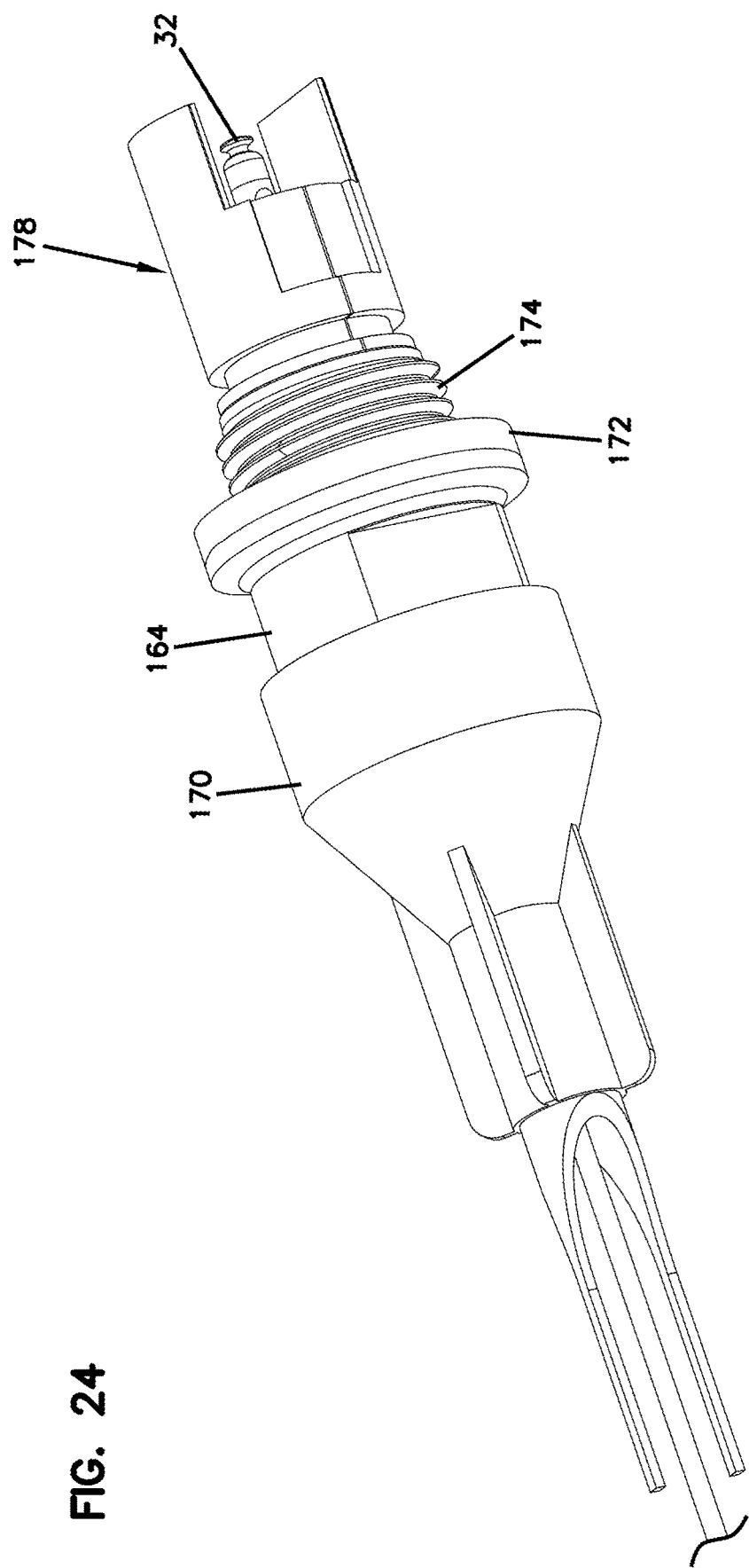
FIG. 24 shows a seventh step for installing the field installable subassembly of FIG. 17 over the factory terminated subassembly of FIG. 1, in this step the plug locator is inserted into a front end of the hardened coupling element.

Referring to FIG. 19, after the ferrule assembly 26 and spring 24 of the factory terminated subassembly 20 have passed through the hardened coupling element 164 in a rear to front direction, the protective casing 50 is removed to expose the ferrule assembly and the spring. The rear housing 177 is then inserted over the fiber optic cable 22 at a location between the spring 24 and the front end of the hardened coupling element 164. It will be appreciated that the rear housing 177 has a longitudinal slot 173 for allowing the rear housing 177 to be readily laterally inserted over the fiber optic cable 22. As shown at FIG. 20, the plug body 192 is then coaxially aligned in front of the ferrule assembly 26 as shown at FIG. 20. Thereafter, the ferrule assembly 26 is loaded into the plug body 192 through the back side of the plug body 192 (see FIG. 21) and the rear housing 177 is then snapped into the back side of the plug body 192 to capture the spring 24 and the ferrule assembly 26 within the interior of the plug body 192. With the ferrule assembly 26 mounted within the plug body 192, the ferrule 28 protrudes forwardly through the front side of the plug body 192. It will be appreciated that the ferrule assembly 26 is preferably loaded in a tuned position relative to the plug body 192.

Once the plug body 192 and the rear housing 177 have been interconnected, two half-pieces of the plug locator 178 can be mated together over the assembled plug body 192 and rear housing 177 such that the plug body 192 and the rear housing 177 are captured within the interior of the plug locator 178. It will be appreciated that the interior of the plug locator 178 can have a shape that compliments the exterior shape of the plug body 192 and the rear housing 177 such that the plug body 192 is securely axially retained relative to the plug locator 178. U.S. Pat. No. 7,614,797, which is hereby incorporated by reference in its entirety, provides more details about the half-pieces of the plug locator 178.

After the plug locator 178 has been mounted over the plug body 192 and the rear housing 177, the plug locator 178 is inserted rearwardly into the front end of the hardened coupling element 164 until the radial shoulder 181 abuts against the front end face of the hardened coupling element 164. Upon insertion of the plug locator 178 in the hardened coupling element 164, the field installable subassembly 162 is fully installed and the ruggedized fiber optic connector is ready to be mated with the corresponding fiber optic adapter 90. For example, the dust cap 32 can be removed and front end of the plug locator 178 can be inserted into the fiber optic adapter 90 with the paddles 182, 184 and the form factor of the plug body 192 ensuring that the plug locator 178 is inserted into the fiber optic adapter at the appropriate rotational orientation. Thereafter, the hardened coupling element 164 is rotated relative to the plug locator 178 and the fiber optic cable 22 to engage the twist-to-lock coupling interface 174 of the hardened coupling element 164 with the corresponding twist-to-lock coupling interface of the fiber optic adapter. In the case of threads, exterior threads of the hardened coupling element 164 thread within corresponding interior threads defined by the hardened fiber adapter 90. The threading process continues until the annular seal 172 is suitably compressed. Thereafter, the seal expansion tube 176 is removed from within the elastomeric sealing sleeve 170 such that the rear portion of the elastomeric sealing sleeve 170 constricts down upon the fiber optic cable 22 to provide a seal about the fiber optic cable 22.

While the field installable subassemblies 62 and 162 have been depicted as ruggedized assemblies, it will be appreciated that non-ruggedized assemblies could also be used. Thus, the factory terminated subassembly 20 can function as a platform upon which any number of different connector configuration assemblies can be built.

It will be appreciated that the factory terminated subassembly 20 can also be referred to as a base-level subassembly or a core subassembly. Additionally, while the subassemblies 62, 162 have been described as being field installable, it will be appreciated that such assemblies can also be assembled in the factory under certain conditions. However, it will be appreciated that typically the field installable subassemblies would be installed in the field about a factory terminated subassembly 20 after the factory terminated subassembly has been routed through a duct or other structure to a desired optical connection location.

Figure 25:
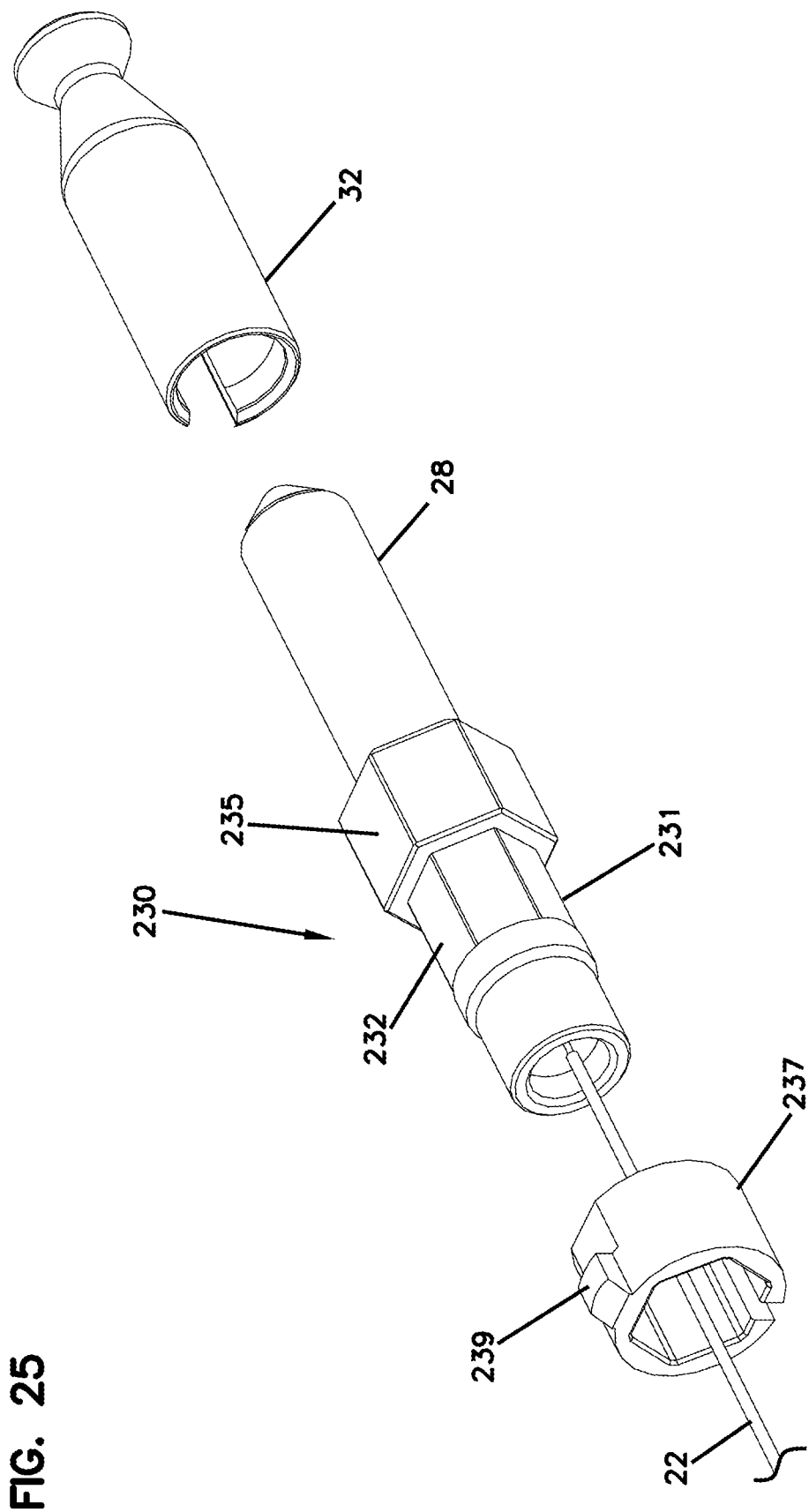
FIG. 25 shows another factory terminated subassembly in accordance with the principles of the present disclosure, the subassembly include a ferrule hub on which a tuning key mounts.

In certain examples, the factory terminated subassembly 20 may further include a supplemental structure that ensures the factory terminated subassembly 20 is installed in the properly tuned position in the field. For example, FIG. 25 shows an alternative the ferrule hub 230 including a tuning key mount 231 having circumferential position indicators 232 in alignment with circumferential position indicators 235 defined by a ferrule hub flange 236. A tuning key 237 can be mounted on the tuning key mount 231 with a key member 239 of the tuning key 237 positioned at a predetermined rotational location relative to the core offset direction (e.g., axially aligned, offset 180 degrees, etc.). Typically, the key member 239 will align with a tuning marking provided on the ferrule hub flange 236. When a field installable subassembly is mounted over the factory terminated subassembly in the field, a plug of the field installable subassembly has a keyway that mates with the key member 239 of the tuning key 237 so that the ferrule assembly can only be inserted in one rotational position relative to the plug. In this way, tuning is ensured.

From the forgoing detailed description, it will be evident that modifications and variations can be made in the devices of the disclosure without departing from the spirit or scope of the invention.

What is claimed is:

1. A field installable connector system, comprising:
a first subassembly including a fiber optic cable including an optical fiber terminated at a ferrule; and
a second subassembly extending from a front end to a back end along a longitudinal axis, including:
a housing, the housing defining a through passage;
a seal element for sealing the second subassembly relative to a port of a fiber optic adapter;
a hardened coupling element;
a plug body that receives the ferrule assembly; and
a plug locator mounted to the housing, the plug locator being configured to key the plug body relative to a fiber optic adapter, the plug locator extending longitudinally from a front end of the plug locator to a back end of the plug locator, the plug locator defining a longitudinal cable access slot extending from the front end of the plug locator to the back end of the plug locator, the fiber optic cable being laterally insertable into the longitudinal cable access slot to mount the plug locator to the fiber optic cable.

2. The field installable connector system of claim 1, wherein the plug locator includes a pair of opposite paddles.

3. The field installable connector system of claim 1, further comprising a fiber optic adapter configured to mate with the plug body.

4. The field installable connector system of claim 1, wherein the plug body has an SC type form factor.

5. The field installable connector system of claim 1, wherein the hardened coupling element is mounted to turn about the longitudinal axis, the hardened coupling element including a twist-to-lock coupling interface.

6. The field installable connector system of claim 1, wherein the seal element is adjacent a front end of the housing.

7. The field installable connector system of claim 6, wherein the seal element is annular, and wherein the seal element is mounted in a groove defined by the housing.

8. The field installable connector system of claim 1, wherein the ferrule assembly is tuned relative to the plug body.

9. The field installable connector system of claim 1, wherein the first subassembly includes a spring for biasing the ferrule assembly forwardly relative to the plug body.

10. The field installable connector system of claim 1, wherein the fiber optic cable is anchored to a ferrule hub in which a base end of the ferrule is mounted.

11. The field installable connector system of claim 10, wherein the fiber optic cable includes a jacket and at least one strength member, and wherein the strength member is bonded to the ferrule hub.

12. A field installable connector system, comprising:
a first subassembly including a fiber optic cable including an optical fiber terminated at a ferrule, the subassembly defining a longitudinal axis; and
a second subassembly extending from a front end to a back end along a longitudinal axis, including:
a housing, the housing defining a through passage;
a seal element for sealing the second subassembly relative to a port of a fiber optic adapter;
a hardened coupling element;
a plug body that receives the ferrule assembly; and
a plug locator mounted to the housing, the plug locator being configured to key the plug body relative to a fiber optic adapter, the plug locator including two mating half-pieces for allowing the fiber optic cable to be laterally inserted into the interior of the plug locator.

13. The field installable connector system of claim 12, wherein the plug locator includes a pair of opposite paddles configured to key the plug body relative to a fiber optic adapter.

14. The field installable connector system of claim 12, further comprising a fiber optic adapter configured to mate with the plug body.

15. The field installable connector system of claim 12, wherein the plug body has an SC type form factor.

16. The field installable connector system of claim 12, wherein the hardened coupling element is mounted to turn about the longitudinal axis, the hardened coupling element including a twist-to-lock coupling interface.

17. The field installable connector system of claim 12, wherein the seal element is annular and adjacent a front end of the housing and mounted in a groove defined by the housing.

18. A method of assembling a fiber optic connector, comprising:
routing a connector subassembly through a duct, the connector subassembly including a fiber optic cable including an optical fiber terminated at a ferrule;
subsequent to the routing, inserting the cable in a housing defining a through passage;
subsequent to the inserting, longitudinally passing the first subassembly through a hardened coupling element and mounting the hardened coupling element to the housing;
subsequent to the passing, laterally inserting the cable through a longitudinal cable access slot of a plug locator;
subsequent to the laterally inserting, mounting the plug locator to the housing; and
mounting a plug body to the housing such that the plug body receives the ferrule assembly.

19. The method of claim 18, further comprising:
inserting the plug body in a port of a fiber optic adapter and rotating the hardened coupling element to secure the plug body in the port.

20. The method of claim 18, wherein the routing includes pushing or pulling the subassembly through the duct.

* * * * *